United States Patent
Moriya et al.

(10) Patent No.: US 11,179,872 B2
(45) Date of Patent: Nov. 23, 2021

(54) RESIN SHAPING MOLD AND METHOD OF PRODUCING RESIN MOLDED PRODUCT

(71) Applicant: CANON KABUSHIKI KAISHA, Tokyo (JP)

(72) Inventors: Yuta Moriya, Chigasaki (JP); Tatsurou Fujii, Kawasaki (JP); Tomohiro Shima, Yokohama (JP); Koki Kodaira, Yorktown, VA (US); Hitoshi Nakashige, Mitaka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 246 days.

(21) Appl. No.: 16/152,665

(22) Filed: Oct. 5, 2018

(65) Prior Publication Data
US 2019/0118440 A1    Apr. 25, 2019

(30) Foreign Application Priority Data

Oct. 24, 2017 (JP) .............................. JP2017-205561
Sep. 14, 2018 (JP) .............................. JP2018-172361

(51) Int. Cl.
*B29C 45/28* (2006.01)
*B29C 45/27* (2006.01)
*B29K 67/00* (2006.01)

(52) U.S. Cl.
CPC ...... *B29C 45/2806* (2013.01); *B29C 45/2756* (2013.01); *B29K 2067/006* (2013.01)

(58) Field of Classification Search
CPC . B29C 45/2806; B29C 45/2756; B29C 45/26; B29C 45/2602; B29C 45/27; B29K 2067/006

See application file for complete search history.

(56) References Cited

U.S. PATENT DOCUMENTS 4,662,837 A * 5/1987 Anderson ............... B29C 45/27
                                                      264/328.15
4,867,668 A   9/1989 Miyairi
(Continued)

FOREIGN PATENT DOCUMENTS

CN    101612778 A      12/2009
JP    02192921 A *  7/1990  ......... B29C 45/2701
(Continued)

OTHER PUBLICATIONS

First Office Action in Chinese Application No. 201811233190.6 (dated Jan. 2021).

(Continued)

*Primary Examiner* — Jacob T Minskey
*Assistant Examiner* — Caroline Montiel
(74) *Attorney, Agent, or Firm* — Venable LLP

(57) ABSTRACT

A resin shaping mold includes a hot runner, a cavity, a cold runner, and a valve pin. The cold runner is connected to the hot runner and the cavity. The cold runner has a lower temperature than the hot runner. The valve pin configured to move forward and backward from the hot runner toward the cold runner and close a channel of molten resin from the hot runner to the cavity at a predetermined position. The valve pin includes a runner lock portion configured to hold resin solidified at a position further on the cavity side with respect to the predetermined position in the cold runner.

19 Claims, 25 Drawing Sheets

(56) References Cited

U.S. PATENT DOCUMENTS

| | | | | |
|---|---|---|---|---|
| 2003/0185931 A1* | 10/2003 | VanAst | ............... | B29C 45/2756 |
| | | | | 425/572 |
| 2004/0101589 A1* | 5/2004 | Babin | ................. | B29C 45/2737 |
| | | | | 425/549 |
| 2009/0315218 A1* | 12/2009 | Izumo | ................. | B29C 45/2616 |
| | | | | 264/328.12 |
| 2010/0295216 A1* | 11/2010 | Shin | ........................ | B29C 45/38 |
| | | | | 264/328.15 |
| 2017/0282427 A1* | 10/2017 | Ohno | .................. | B29C 45/2737 |
| 2018/0147762 A1* | 5/2018 | Folaron | ............... | B29C 45/2806 |

FOREIGN PATENT DOCUMENTS

| | | |
|---|---|---|
| JP | 3-261528 A | 11/1991 |
| WO | WO 2003031142 A1 * | 4/2003 |

OTHER PUBLICATIONS

First Office Action in Chinese Application No. 201811233190.6 (Jan. 2020).

\* cited by examiner

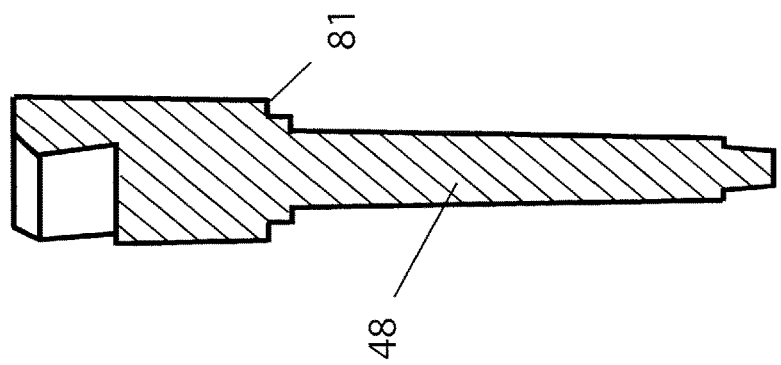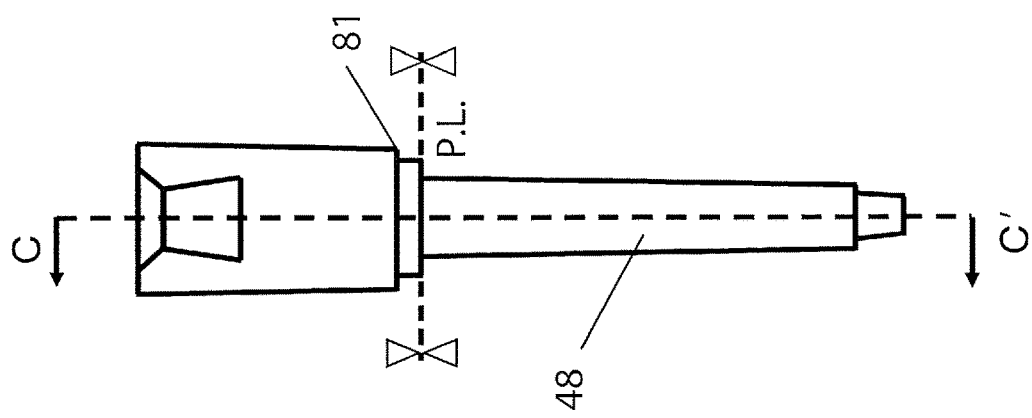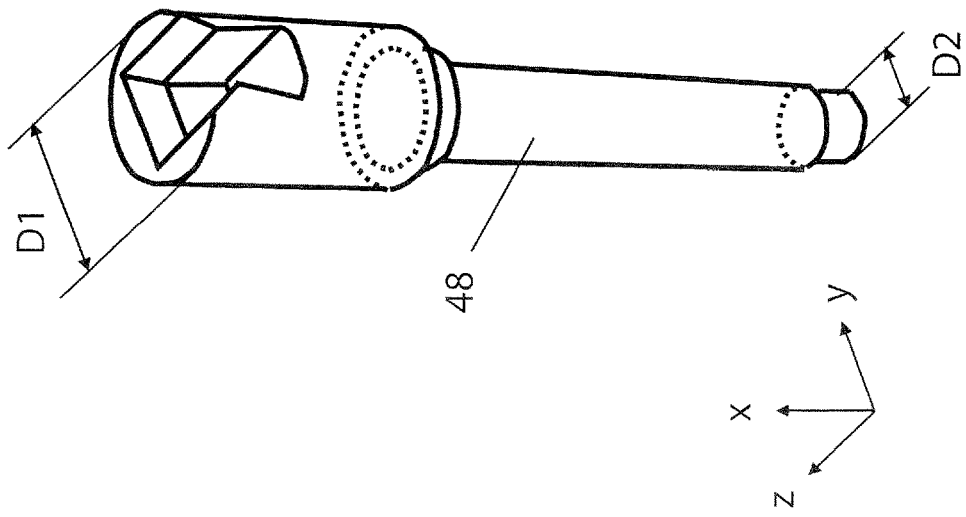

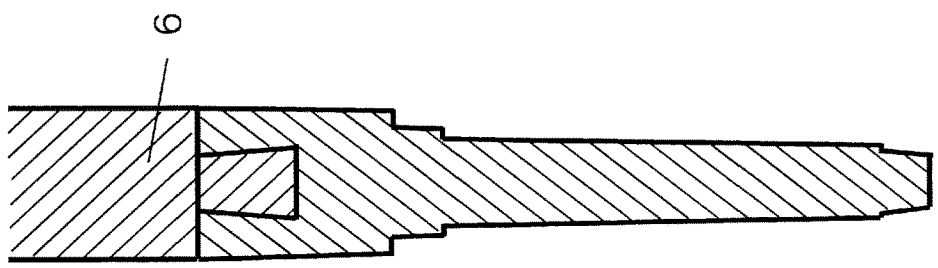
FIG.19D
FIG.19C
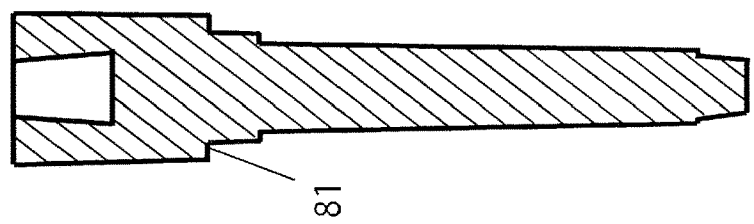
FIG.19B
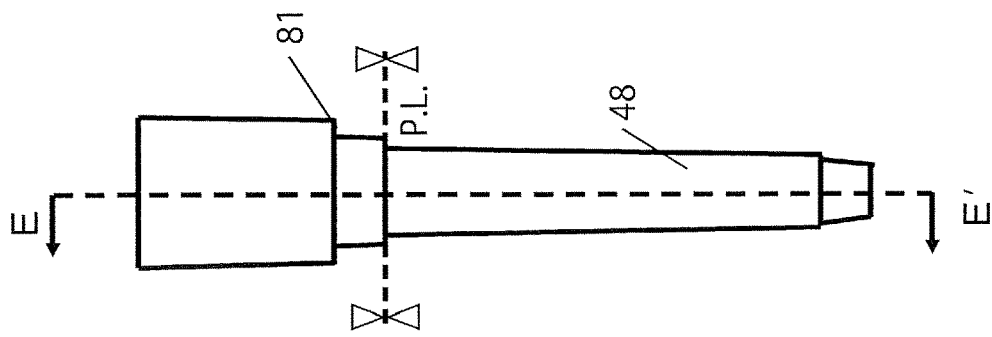
FIG.19A
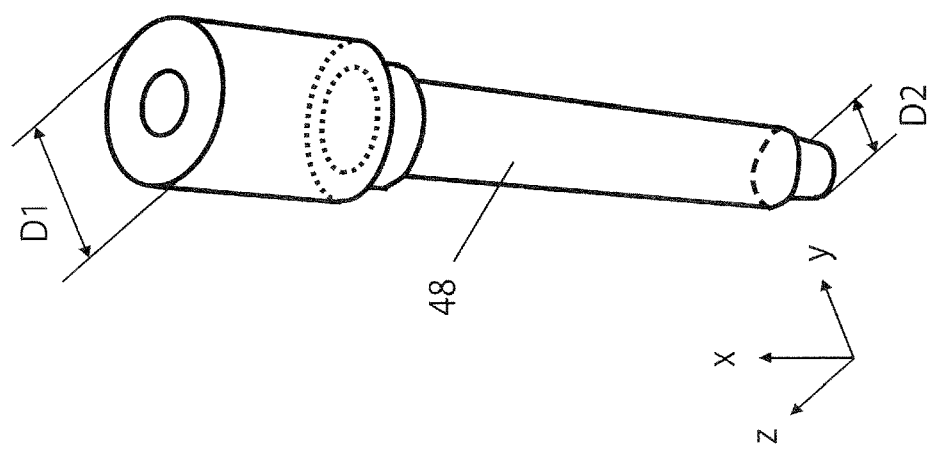

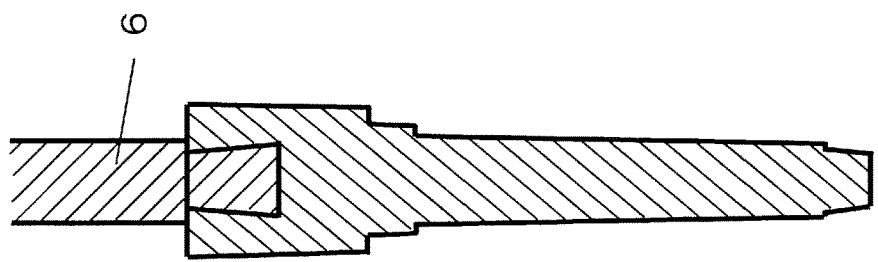
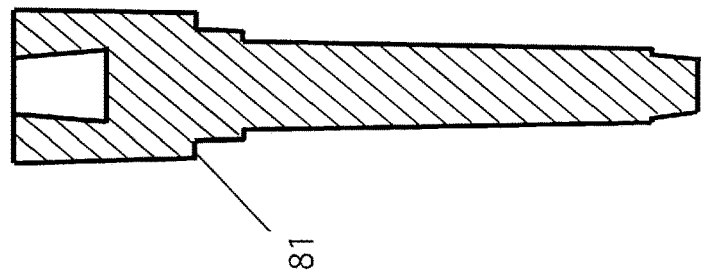
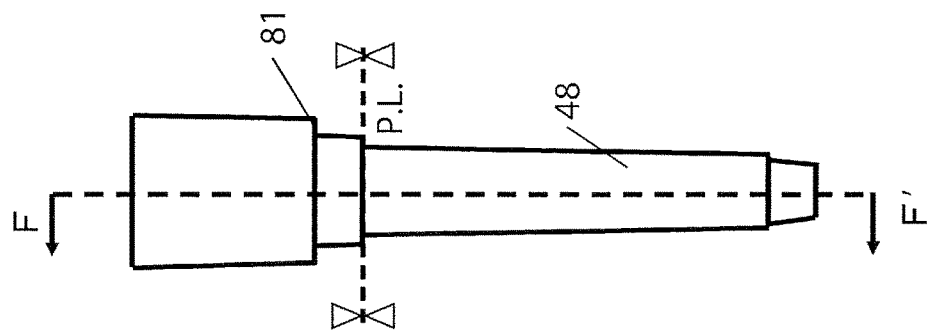
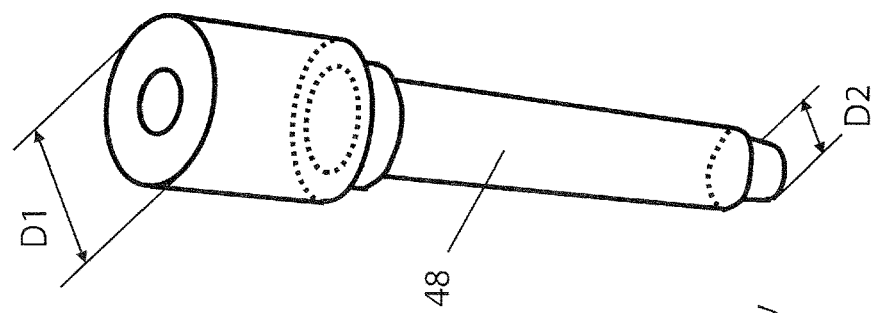
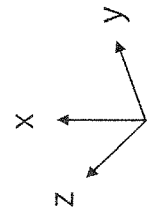

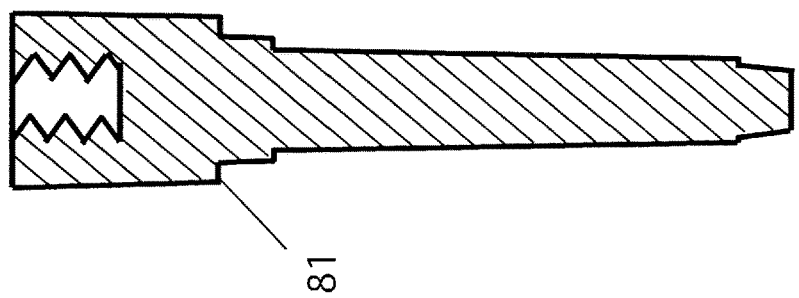
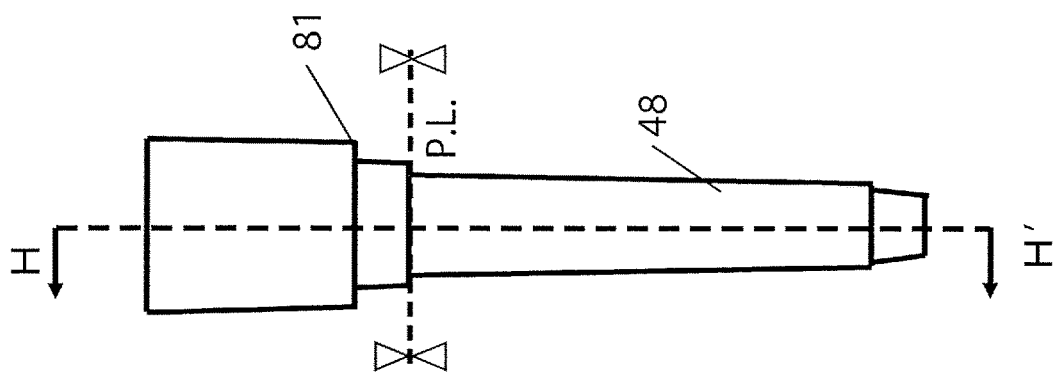
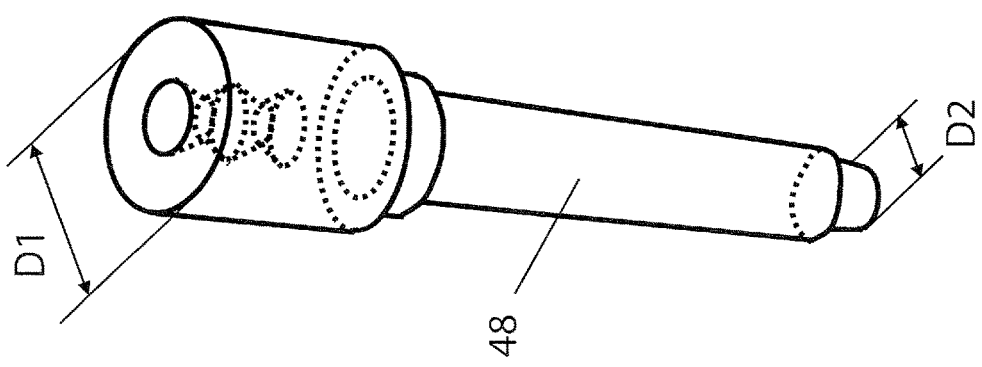

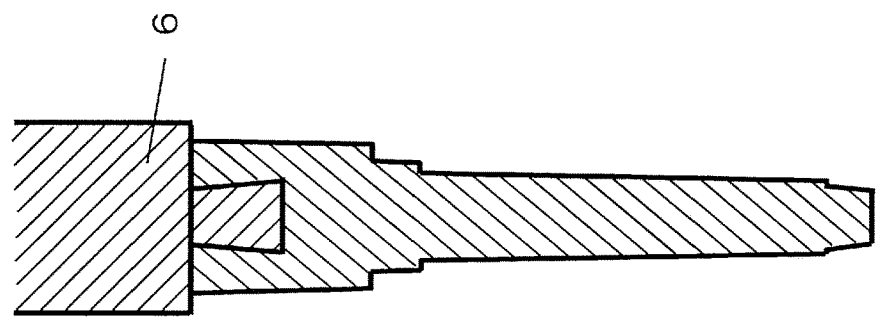
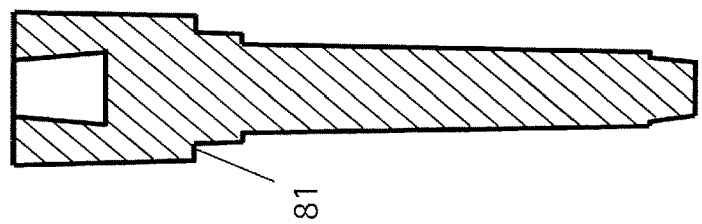
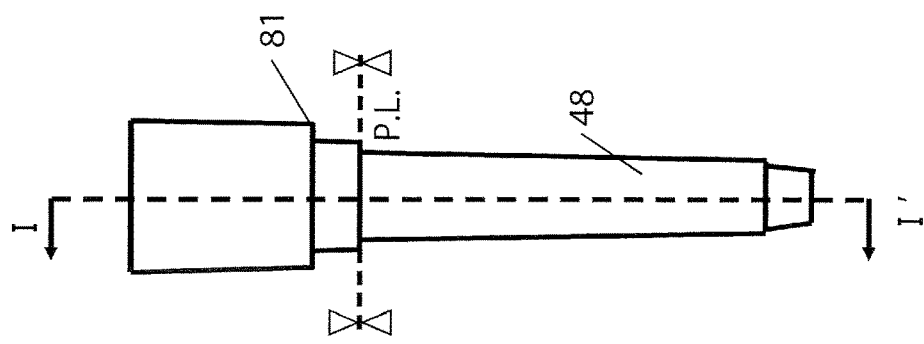
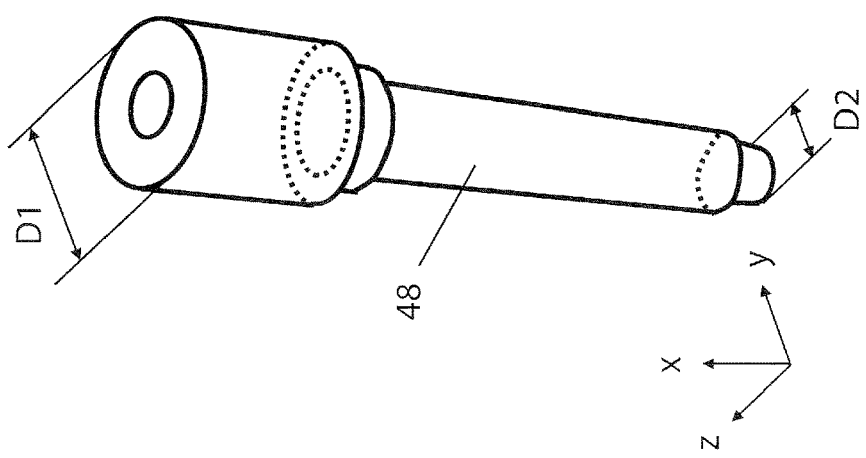

RESIN SHAPING MOLD AND METHOD OF PRODUCING RESIN MOLDED PRODUCT

BACKGROUND OF THE INVENTION

Field of the Invention

The present invention relates to a resin shaping mold including a cavity, a hot runner block, and a cold runner block connected to the cavity and the hot runner block. Particularly, the present invention relates to a resin shaping mold that can reduce resin that solidifies in the cold runner, that is, resin that solidifies without being used for a molded product itself, and to a method of producing a resin molded product using this resin shaping mold.

Description of the Related Art

As a resin shaping mold for injection molding of thermoplastic resin such as plastics, a cold runner mold and a hot runner mold are known. Although the cold runner mold has a merit that the cold runner mold has a simple structure, it is desired to use the hot runner mold with which the amount of resin waste is small from the viewpoint of improving economies and reducing an environmental load because, with the cold runner mold, resin that solidifies in a runner portion becomes a waste. In the case where the hot runner mold in which the entirety of the runner portion is heated, the resin molded product can be obtained without generating almost any resin waste.

However, a hot runner portion needs a predetermined size to provide a heating mechanism, which is restrictive for use. For example, in the case where the size of the resin molded product is small, sometimes an area large enough to install and connect the hot runner portion cannot be secured in the cavity. In addition, in the case of producing a resin molded product having a complex concavo-convex shape, it is sometimes difficult to directly connect the hot runner portion to the cavity because the hot runner portion interferes with the concavo-convex shape of the shaping mold.

Therefore, a hot runner mold in which part of runner is constituted by a cold runner as disclosed in Japanese Patent Laid-Open No. 3-261528 is proposed. In the mold of Japanese Patent Laid-Open No. 3-261528, a sprue bush that is a constituent component of a hot runner is provided for each cavity, and an undercut shape is imparted to an outer periphery portion of the distal end thereof. As a result of molten resin getting into the undercut shape portion and solidifying, the resin solidified in the cold runner portion can be held by the sprue bush of the hot runner. According to a method of Japanese Patent Laid-Open No. 3-261528, the volume of the resin that solidifies in the cold runner portion is reduced by changing a runner branch that is conventionally constituted by a cold runner to a hot runner.

However, according to the method of Japanese Patent Laid-Open No. 3-261528, since the resin solidified in the cold runner portion is held by the distal end of the sprue bush, the solidified resin is as large as or larger than the outer shape of the sprue bush, and thus the volume of the solidified resin is still large.

In addition, since the sprue bush of the hot runner is disposed at a position extremely close to the hot runner, the sprue bush is generally at a high temperature. Therefore, there is a risk that resin in contact with the undercut portion at the distal end of the sprue bush does not sufficiently solidify, thus breaks when separating the undercut portion from the molded product without showing sufficient holding power, and part of the resin is left in the mold.

Therefore, a mold which can reduce the amount of resin solidified in the cold runner portion although part of the runner is constituted by the cold runner, and from which the solidified product can be stably taken out has been desired.

SUMMARY OF THE INVENTION

According to one aspect of the present invention, a resin shaping mold includes a hot runner, a cavity, a cold runner that is connected to the hot runner and the cavity and has a lower temperature than the hot runner, and a valve pin configured to move forward and backward from the hot runner toward the cold runner and close a channel of molten resin from the hot runner to the cavity at a predetermined position. The valve pin includes a runner lock portion configured to hold resin solidified at a position further on the cavity side with respect to the predetermined position in the cold runner.

Further features of the present invention will become apparent from the following description of exemplary embodiments with reference to the attached drawings.

BRIEF DESCRIPTION OF THE DRAWINGS

FIG. 17A is an external view of runner-solidified matter of Example 4.

FIG. 17B is an X-Y plan view of the runner-solidified matter of Example 4.

FIG. 17C is a section view of the runner-solidified matter of Example 4.

FIG. 19A is an external view of runner-solidified matter of Example 6.

FIG. 19B is an X-Y plan view of the runner-solidified matter of Example 6.

FIG. 19C is a section view of the runner-solidified matter of Example 6.

FIG. 19D is a diagram illustrating an engaged state of the runner-solidified matter of Example 6.

FIG. 20A is an external view of runner-solidified matter of Example 7.

FIG. 20B is an X-Y plan view of the runner-solidified matter of Example 7.

FIG. 20C is a section view of the runner-solidified matter of Example 7.

FIG. 20D is a diagram illustrating an engaged state of the runner-solidified matter of Example 7.

FIG. 22A is an external view of runner-solidified matter of Example 9.

FIG. 22B is an X-Y plan view of the runner-solidified matter of Example 9.

FIG. 22C is a section view of the runner-solidified matter of Example 9.

FIG. 23A is an external view of runner-solidified matter of Example 11.

FIG. 23B is an X-Y plan view of the runner-solidified matter of Example 11.

FIG. 23C is a section view of the runner-solidified matter of Example 11.

FIG. 23D is a diagram illustrating an engaged state of the runner-solidified matter of Example 11.

DESCRIPTION OF THE EMBODIMENTS

First Exemplary Embodiment

A resin shaping mold and a method of producing a resin molded product serving as a first exemplary embodiment of the present invention will be described below with reference to drawings.

Configuration of Mold

Figure 1:
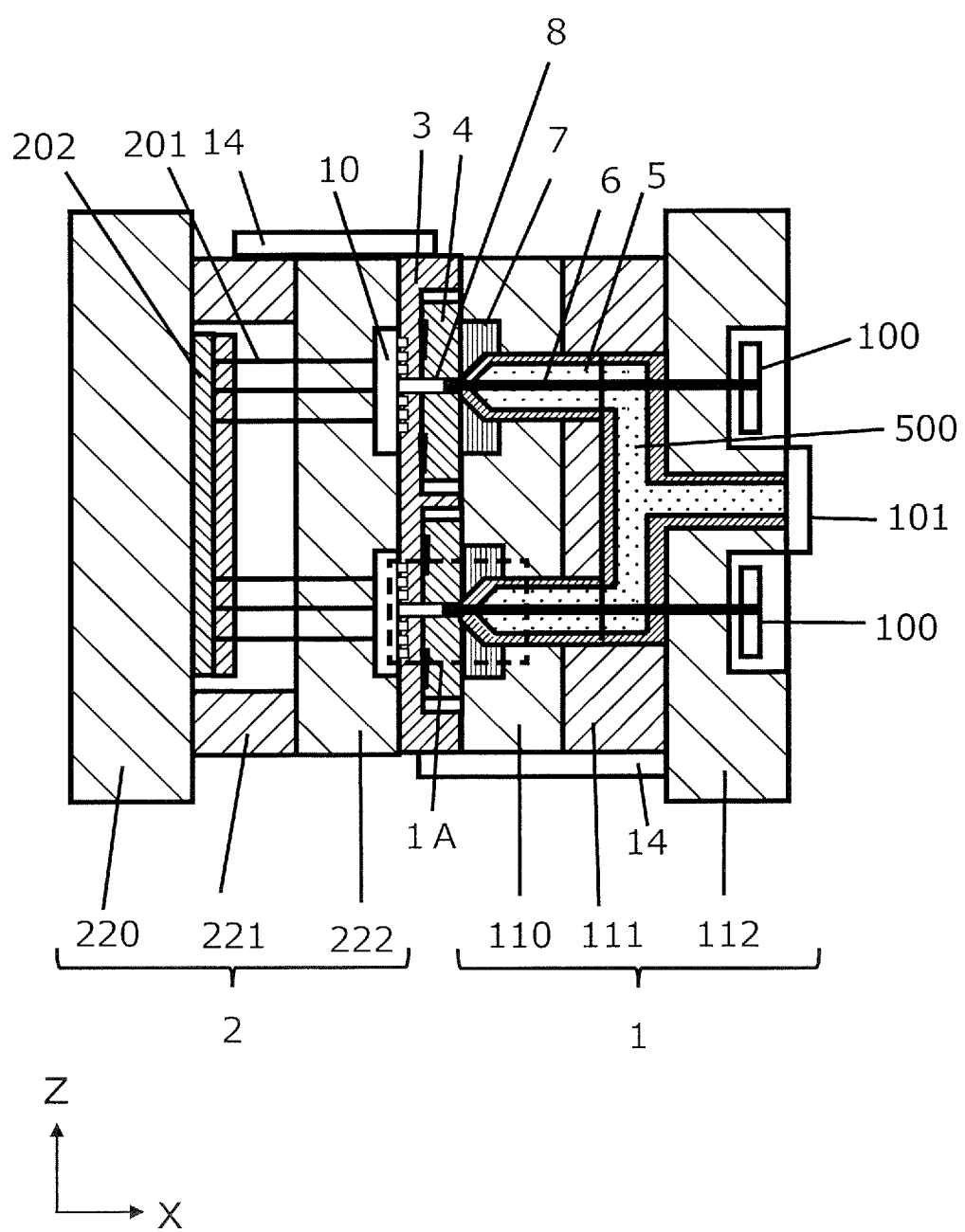
FIG. 1 is a brief section view of a resin shaping mold serving as a first exemplary embodiment illustrating a configuration thereof.

FIG. 1 is a brief section view of a resin shaping mold serving as a first exemplary embodiment illustrating a configuration thereof. FIG. 1 illustrates a fixed-side mold 1, a movable-side mold 2, a first intermediate mold 3, and a second intermediate mold 4. The fixed-side mold 1 includes a fixed-side die set A portion 110, a fixed-side die set B portion 111, and a fixed-side attachment plate 112. The movable-side mold 2 includes a movable-side attachment plate 220, a spacer block 221, and a movable-side die set 222.

The mold of the present exemplary embodiment includes two cavities 10 for molding two molded products, but the number of the cavities is not limited to this.

The mold also includes ejector pins 201 and an ejector plate 202. The ejector pins 201 are projected when releasing the resin molded products formed in the cavities 10. The mold includes a locating ring 101 for locating the mold with respect to an injection apparatus that injects molten resin and pulling links 14 for contact and separation operation of each portion of the mold.

The fixed-side mold 1 includes a hot runner portion for supplying molten resin, and cold runners for introducing the resin supplied from hot runners into the cavities 10 are provided in the second intermediate mold 4 and the first intermediate mold 3. The mold includes hot runners 5, valve pins 6, bushes 7 of the hot runners, cold runners 8, and a manifold portion 500 of the hot runners.

Moten resin supplied to the hot runner portion from the right side of FIG. 1 is distributed to the two cavities 10 via the manifold 500. Distal end portions of the hot runners 5 heading toward the respective cavities 10 are nipped by the bushes 7 and thus fixed to the fixed-side die set A portion 110. The valve pins 6 are held by valve driving mechanisms 100 so as to be capable of moving forward and backward from the inside of the hot runners 5 toward the cold runners 8.

Figure 2:
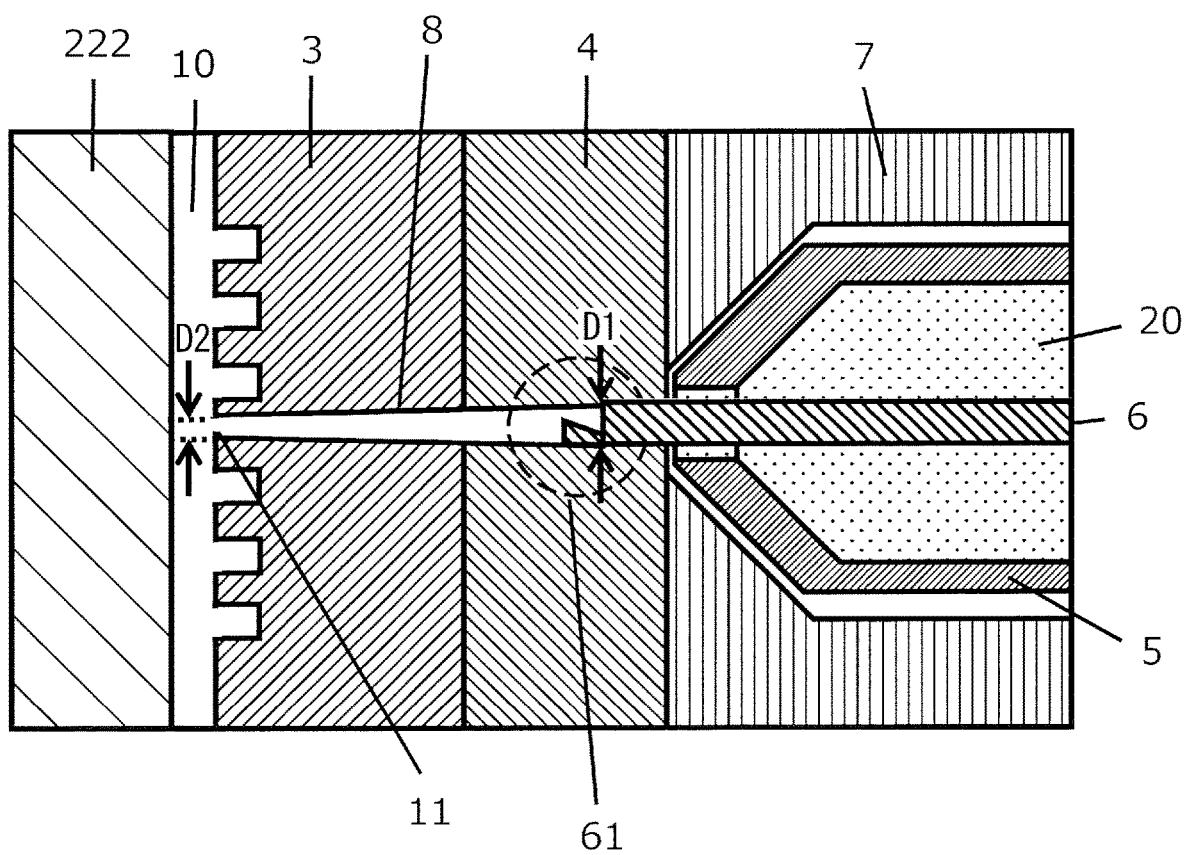
FIG. 2 is a partially enlarged view of the resin shaping mold illustrating a state before resin injection according to the first exemplary embodiment.

FIG. 2 is an enlarged section view of a region 1A enclosed by a dotted line in FIG. 1. To be noted, although distances between members such as the hot runners, bushes, and valve pins are sometimes illustrated larger for the sake of convenience of illustration when showing an enlarged section, in reality there is no gap large enough to allow molten resin to leak. This is not limited to FIG. 2 and can be applied to all diagrams.

FIG. 2 illustrates a state before starting injection of molten resin 20 into the cavities 10. That is, FIG. 2 illustrates a state in which distal ends of the valve pins 6 are projected into the cold runners 8 from the bushes 7 and close the cold runners 8 in firm contact with inner surfaces of the cold runners 8.

The valve pins 6 can close channels of molten resin by advancing to predetermined positions in the cold runners 8, and, conversely, can open the channels by retracting to positions that are further on the +X direction side than the predetermined positions, that is, retracting into the hot runners 5. By opening the channels, the molten resin in the hot runners 5 can be injected into the cavities 10 via the cold runners 8.

After injecting the molten resin into the cavities 10, the valve pins 6 close the cold runners 8. Since the distal ends of the valve pins 6 move away from the hot runners 5 and the bushes 7 that are at high temperature and come into firm contact with the second intermediate mold 4 that is at low temperature, the temperature of the distal ends of the valve pins 6 is reduced. Therefore, solidification of the resin in the cold runners 8 is not affected.

Hereinafter, description will be given for one of two sets of elements respectively provided for the two cavities 10 in the resin shaping mold because the two sets of elements have the same configuration as each other. The distal end of the valve pin 6 is provided with an undercut shape portion as illustrated in a region 61 circled by a dotted line in FIG. 2, and an engagement structure can be formed between the resin solidified in the cold runner 8 and the distal end portion of the valve pin 6. This portion of the engagement structure will be sometimes referred to as a runner lock portion in the description below. In the undercut shape portion, the sectional area of a section of the runner lock portion taken along a plane perpendicular to the axial direction of the valve pin 6 at a position closer to the cavity 10 than a first position is larger than the sectional area of a section of the runner lock portion taken along a plane perpendicular to the axial direction of the valve pin 6 at the first position. The valve pin 6 is formed from, for example, a steel material.

FIG. 2 illustrates a gate 11 through which resin is injected into the cavity 10. The cold runner 8 is formed in a shape tapered from a predetermined position at which the valve pin 6 closes the channel toward the gate 11, that is, such a shape that the sectional area of the channel gradually decreases from the predetermined position to the gate 11. In the present exemplary embodiment, the sectional shape of the channel of the cold runner 8 is circular, and, in the case where the diameter of the channel at the predetermined position is D1 and the diameter of the channel on the gate 11 side is D2, the diameter of the cold runner 8 monotonically decreases from D1 to D2 in a broad sense. Here, "monotonically decreases in a broad sense" indicates that, although the diameter gradually decreases toward the gate 11 without a portion where the diameter increases, a region in which the decrease rate is 0, that is, the sectional area of the channel is constant, may be partially included therein. D1 is the maximum diameter of the cold runner 8, and is equal to or smaller than the diameter of the valve pin 6.

By employing the cold runner 8 having such a tapered shape, the cold runner 8 can be easily connected to the cavity 10 even in the case where the molded product has a complex concavo-convex shape. In addition, the volume of the resin solidified in the cold runner 8 can be reduced, and resin waste can be reduced. Further, the resin solidified in the cold runner 8 can be easily cut at a gate portion, which is the narrowest part, when separating the first intermediate mold 3 and the second intermediate mold 4 from each other, and thus the resin solidified in the cold runner 8 can be easily separated from the resin molded product.

Operation of Mold

Next, a series of operations of a mold apparatus of the present exemplary embodiment will be described with reference to FIGS. 1 and 4 to 10.

Figure 4:
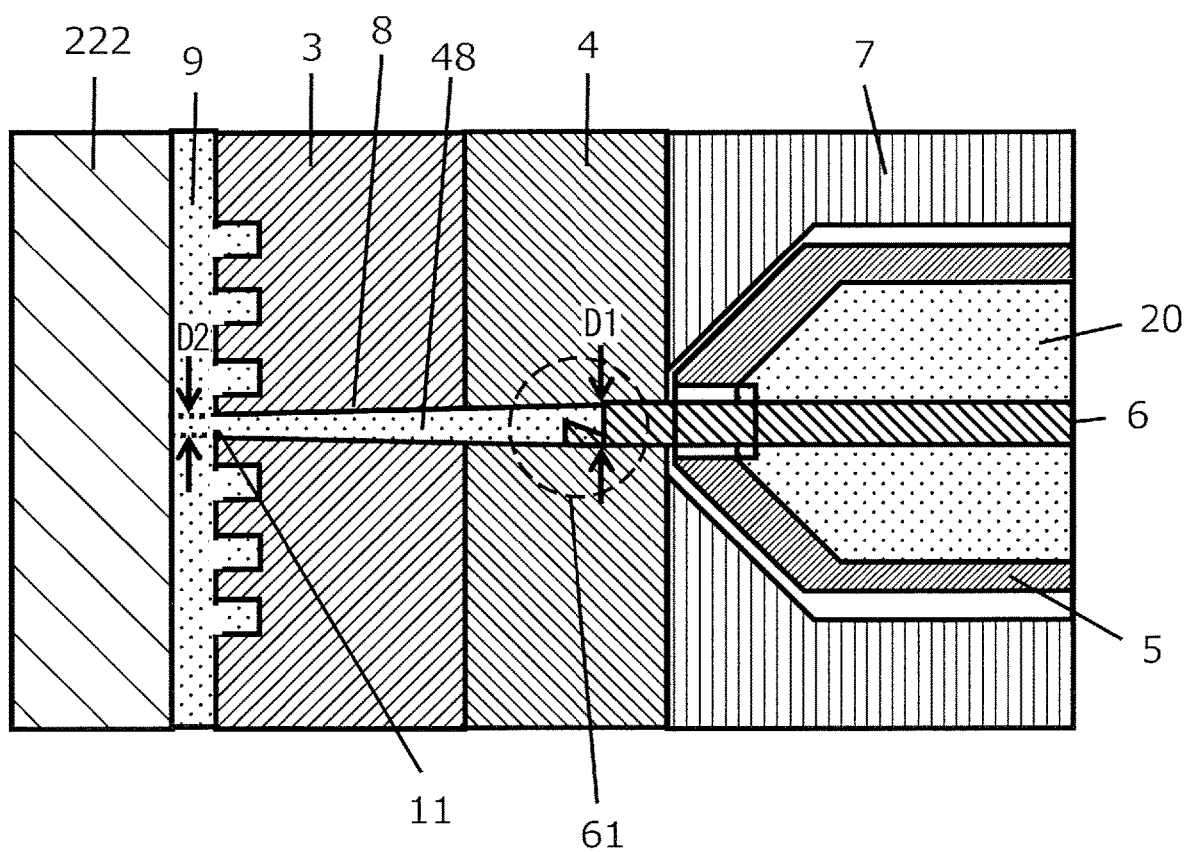
FIG. 4 is a partially enlarged view of the resin shaping mold illustrating a state after resin injection according to the first exemplary embodiment.

First, a first step is a step of injecting molten resin supplied from an unillustrated injection machine into the resin shaping mold illustrated in FIG. 1. First, the valve pin 6 is moved in the +X direction to open the channel of the cold runner 8, and the molten resin injected into the hot runner 5 via the manifold 500 is injected into the corresponding cavity 10 via the cold runner 8 and the gate 11. After the molten resin is injected into the cavity 10, the valve pin 6 is moved forward toward the cold runner 8 to close the cold runner 8. FIG. 4 is an enlarged section view of the resin shaping mold illustrating a state in which the valve pin 6 is closing the cold runner 8 after the molten resin 20 is injected into the cavity 10.

The resin injected into the cavity 10 and the cold runner 8 is cooled and solidifies. To be noted, in the description below, in order to distinguish a resin portion solidified in the cold runner 8 from a resin portion solidified in the cavity 10, the former will be sometimes referred to as runner-solidified matter 48, and the latter will be sometimes referred to as a resin molded product 9.

Figure 5:
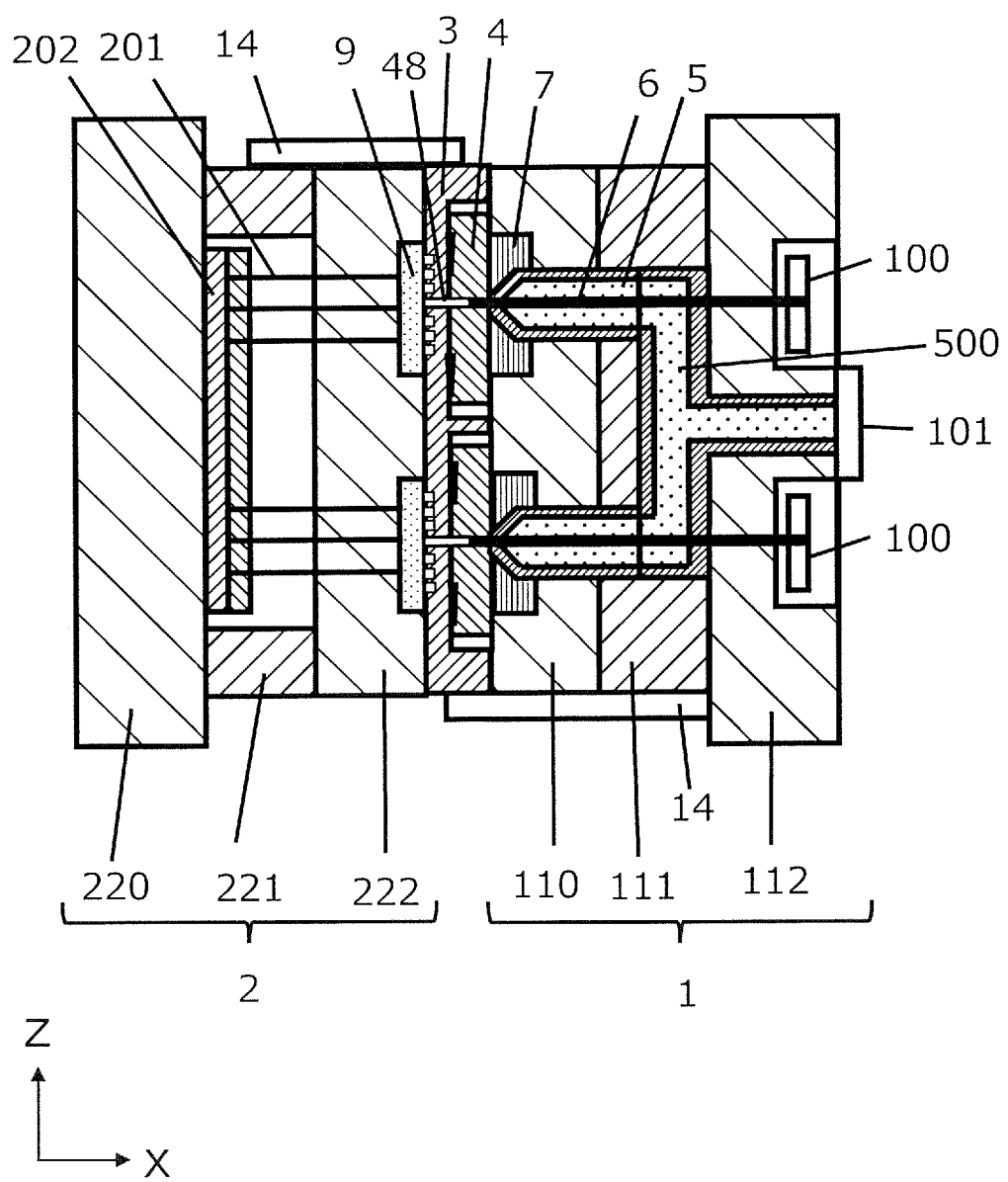
FIG. 5 is a section view of the resin shaping mold illustrating a state of a first step of the exemplary embodiment.

As has been described, the distal end portion of the valve pin 6 moves away from the hot runner 5 and the bush 7 that are at high temperature and come into firm contact with the inner surface of the second intermediate mold 4 that is at low temperature, and thus the temperature thereof is reduced. Therefore, solidification of the resin in the cold runner 8 is not adversely affected. Further, as a result of the runner lock portion at the distal end portion of the valve pin 6, the resin solidified in the cold runner 8 and the valve pin 6 form an engagement structure. By this engagement structure, the runner lock portion can bind the runner-solidified matter 48 in the axial direction of the valve pin 6. FIG. 5 is a section view of the resin shaping mold illustrating a state in which the resin is injected into the cavity 10 and solidified. To be noted, since the valve pin 6 is projected into and closes the cold runner 8, the runner-solidified matter 48 does not directly come into contact with the bush 7.

Figure 6:
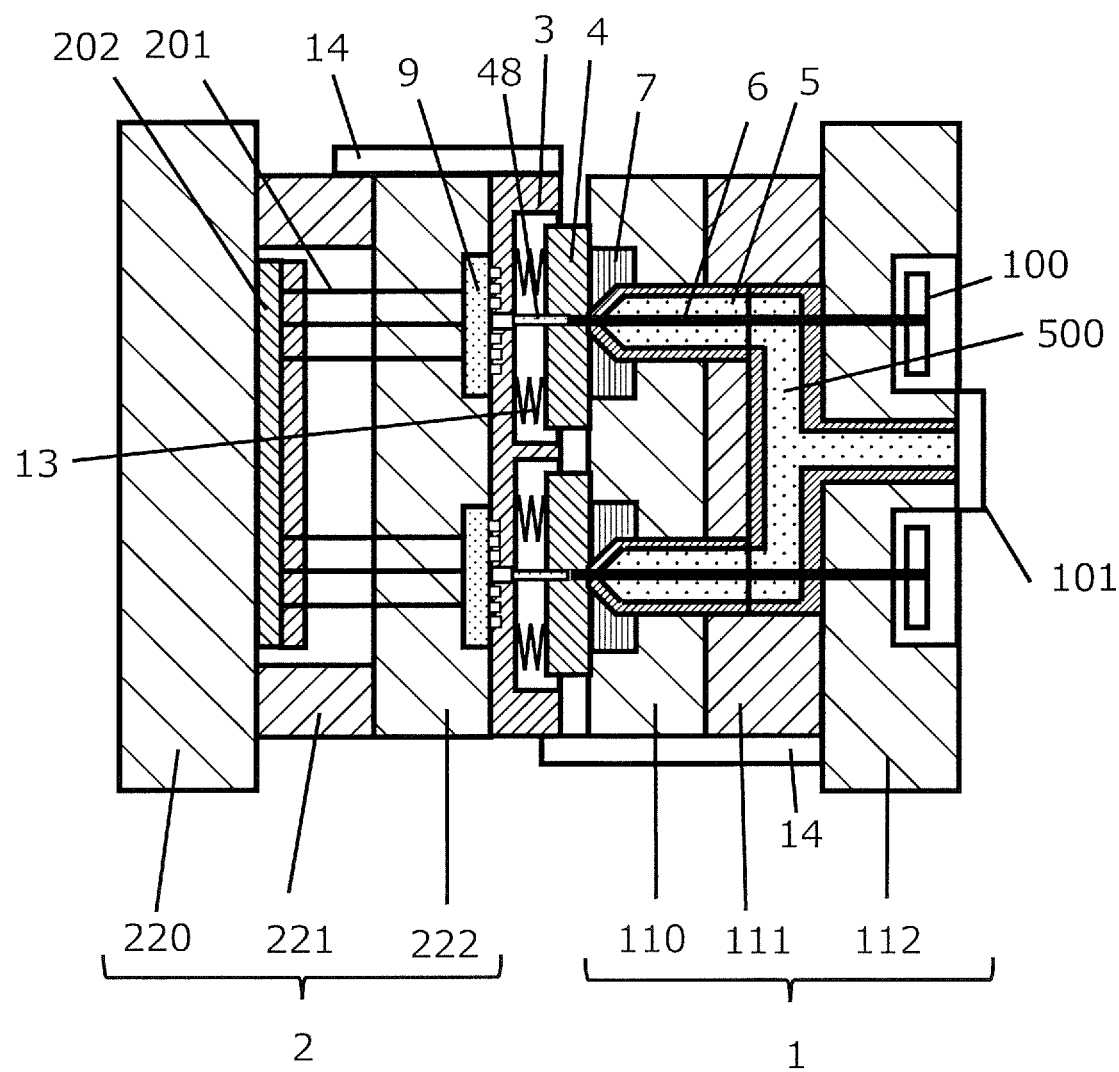
FIG. 6 is a section view of the resin shaping mold illustrating a state of a second step of the exemplary embodiment.

Next, a second step is a step of separating the first intermediate mold 3 and the second intermediate mold 4 from each other. FIG. 6 is a section view of the resin shaping mold illustrating a state in which the first intermediate mold 3 and the second intermediate mold 4 are separated from each other by an action of a separation mechanism 13.

When the first intermediate mold 3 and the second intermediate mold 4 are separated from each other, the runner-solidified matter 48 held by the tapered surface of the second intermediate mold 4 and the runner lock portion of the valve pin 6 is pulled in the +X direction, and is cut at the position of the gate 11, which is the narrowest part. Although the runner-solidified matter 48 that has been cut is released from the first intermediate mold 3, the runner-solidified matter 48 remains held by the tapered surface of the second intermediate mold 4 and the runner lock portion.

Figure 7:
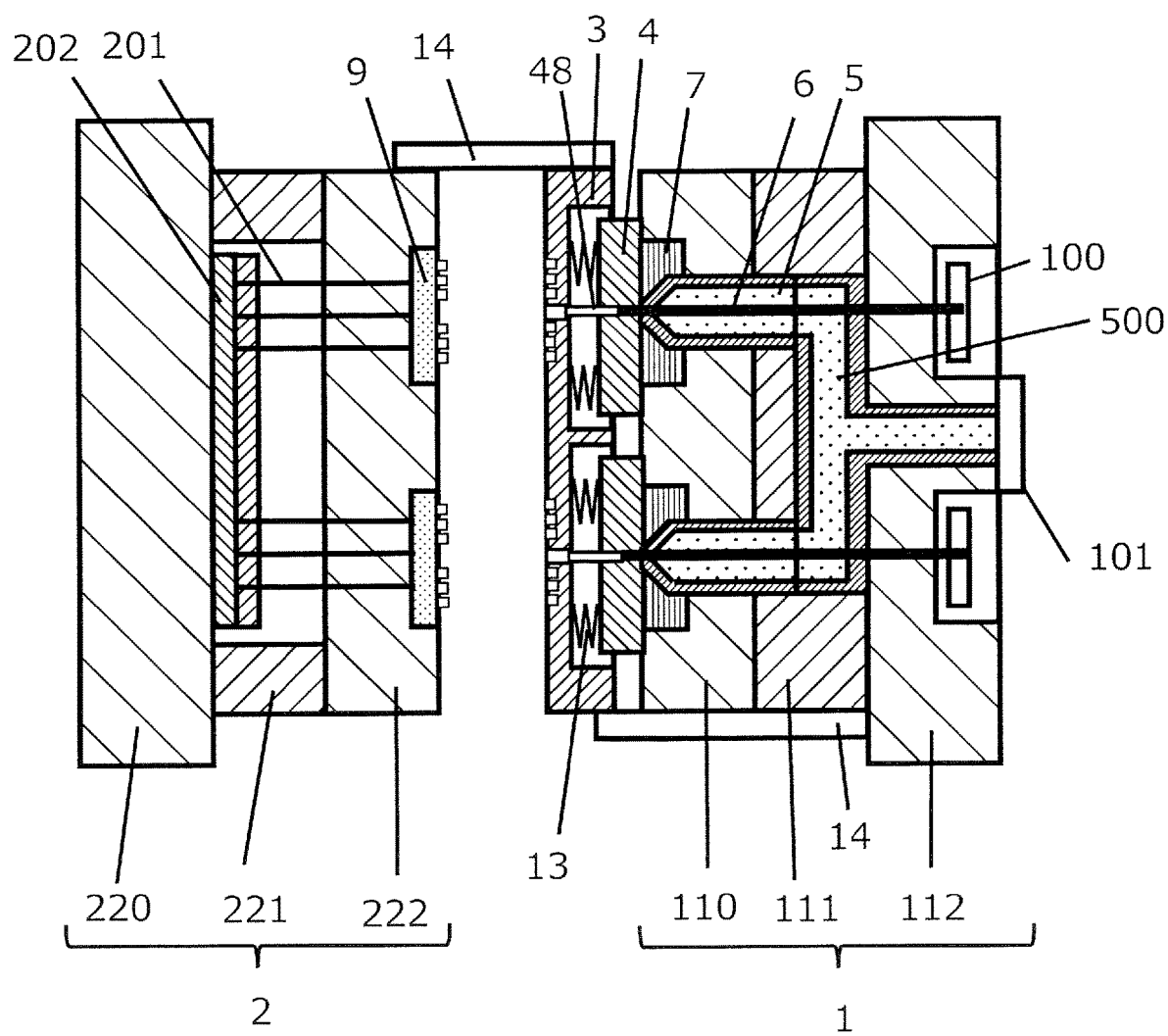
FIG. 7 is a section view of the resin shaping mold illustrating a state of a third step of the exemplary embodiment.

Next, a third step is a step of separating the movable-side mold 2 and the first intermediate mold 3 from each other. FIG. 7 is a section view of the resin shaping mold illustrating a state in which the movable-side mold 2 and the first intermediate mold 3 are separated from each other. In this step, the runner-solidified matter 48 that has been cut is still held by the tapered surface of the second intermediate mold 4 and the runner lock portion.

Figure 8:
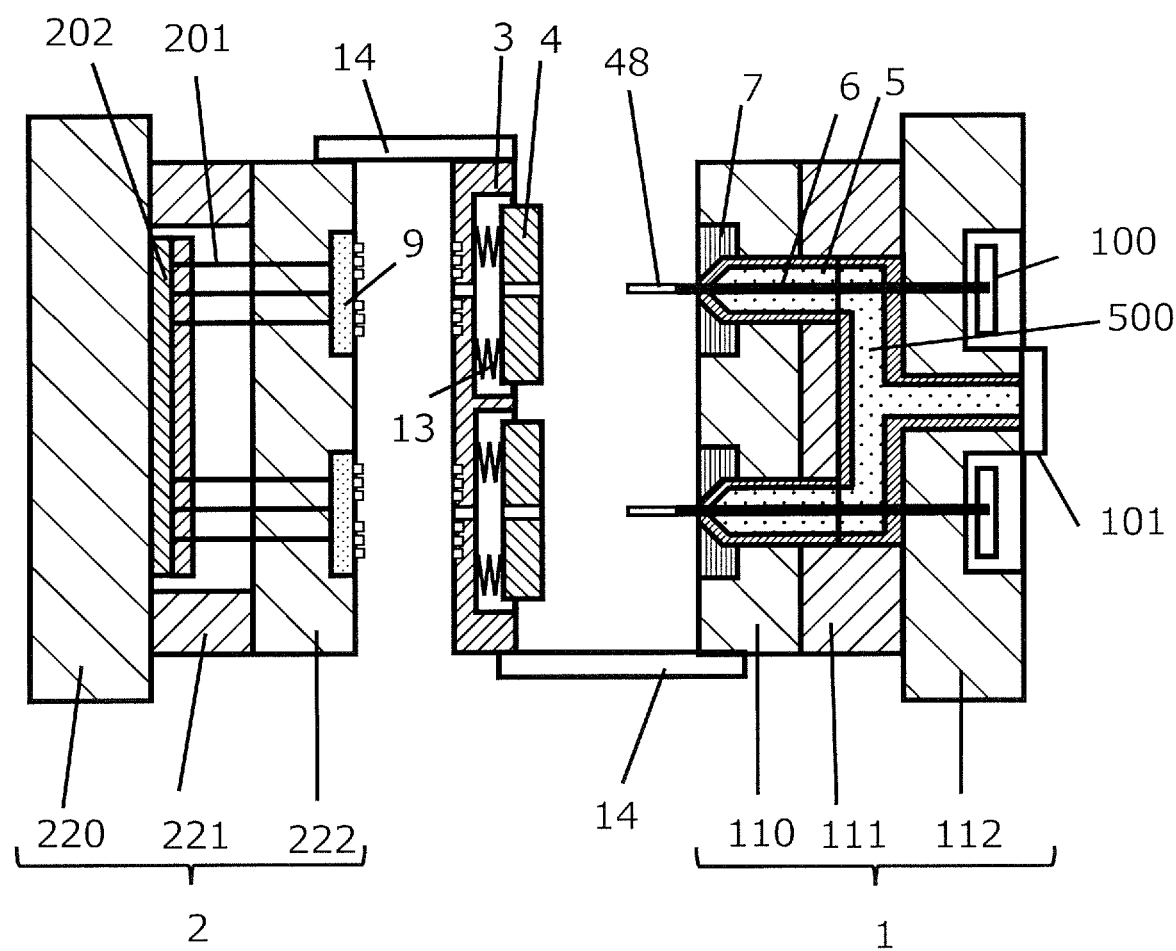
FIG. 8 is a section view of the resin shaping mold illustrating a state of a fourth step of the exemplary embodiment.

Next, a fourth step is a step of separating the fixed-side mold 1 and the second intermediate mold 4 from each other. FIG. 8 is a section view of the resin shaping mold illustrating a state in which the fixed-side mold 1 and the second intermediate mold 4 are separated from each other. In this step, the runner-solidified matter 48 cut off from the resin molded product is still held by the runner lock portion, pulled in the +X direction, and thus released from the second intermediate mold 4.

Figure 9:
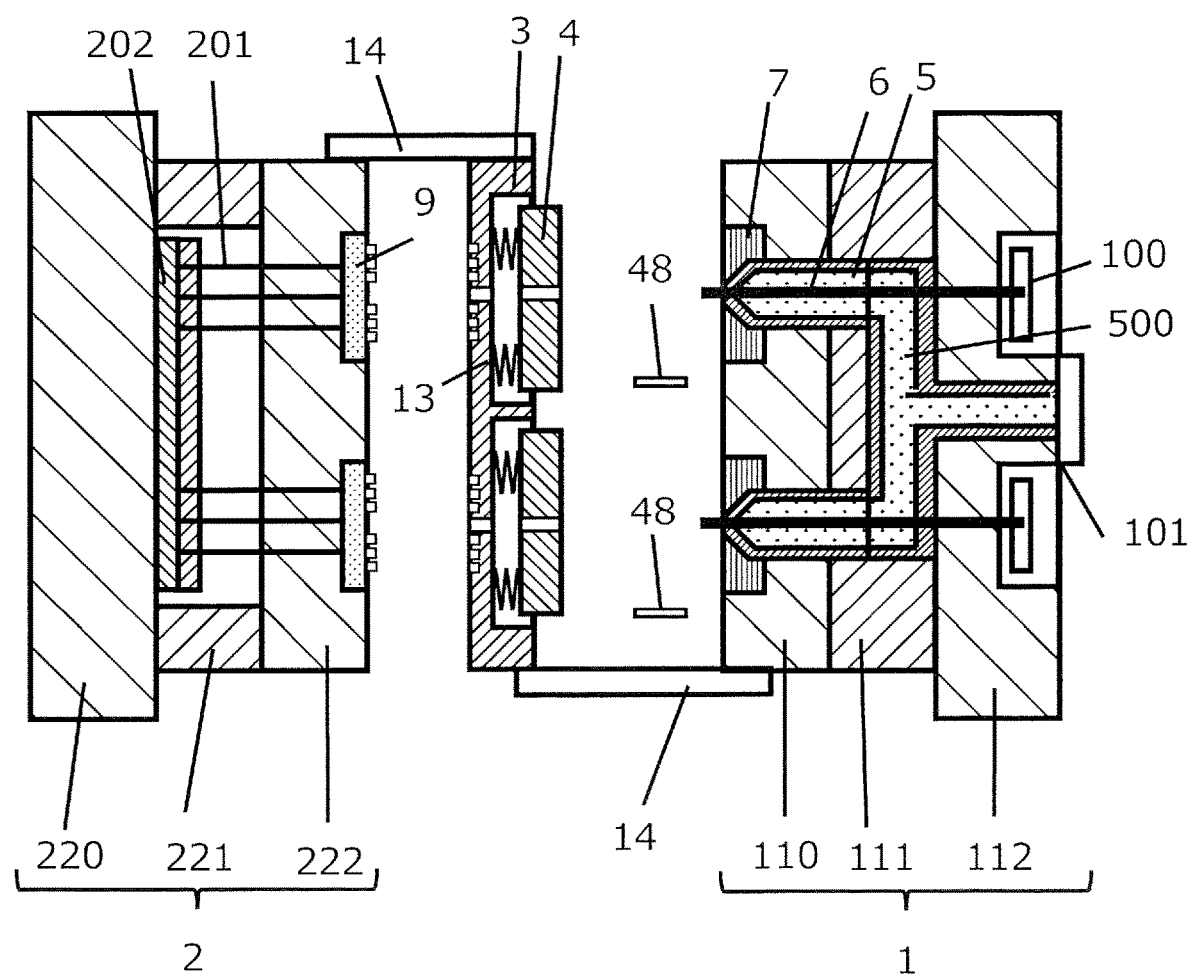
FIG. 9 is a section view of the resin shaping mold illustrating a state of a fifth step of the exemplary embodiment.

Next, a fifth step is a step of taking out the runner-solidified matter 48 from the mold. FIG. 9 is a section view of the resin shaping mold illustrating a state in which the runner-solidified matter 48 is separated from the valve pin 6 and taken out.

As illustrated in FIG. 2, the undercut shape portion is provided in the runner lock portion at the distal end of the valve pin 6. However, after the runner-solidified matter 48 is released from the second intermediate mold 4, the runner-solidified matter 48 is easily separated from the valve pin 6 when receiving force in a direction different from the axial direction, that is, the X direction, of the valve pin 6. That is, the runner-solidified matter 48 falls off due to gravity, and can be taken out of the mold by free falling. In addition, the runner-solidified matter 48 can be easily taken out by applying force in a direction crossing the axial direction, that is, the X direction, of the valve pin 6 by using an auto hand or the like even in the case of not using gravity.

Figure 10:
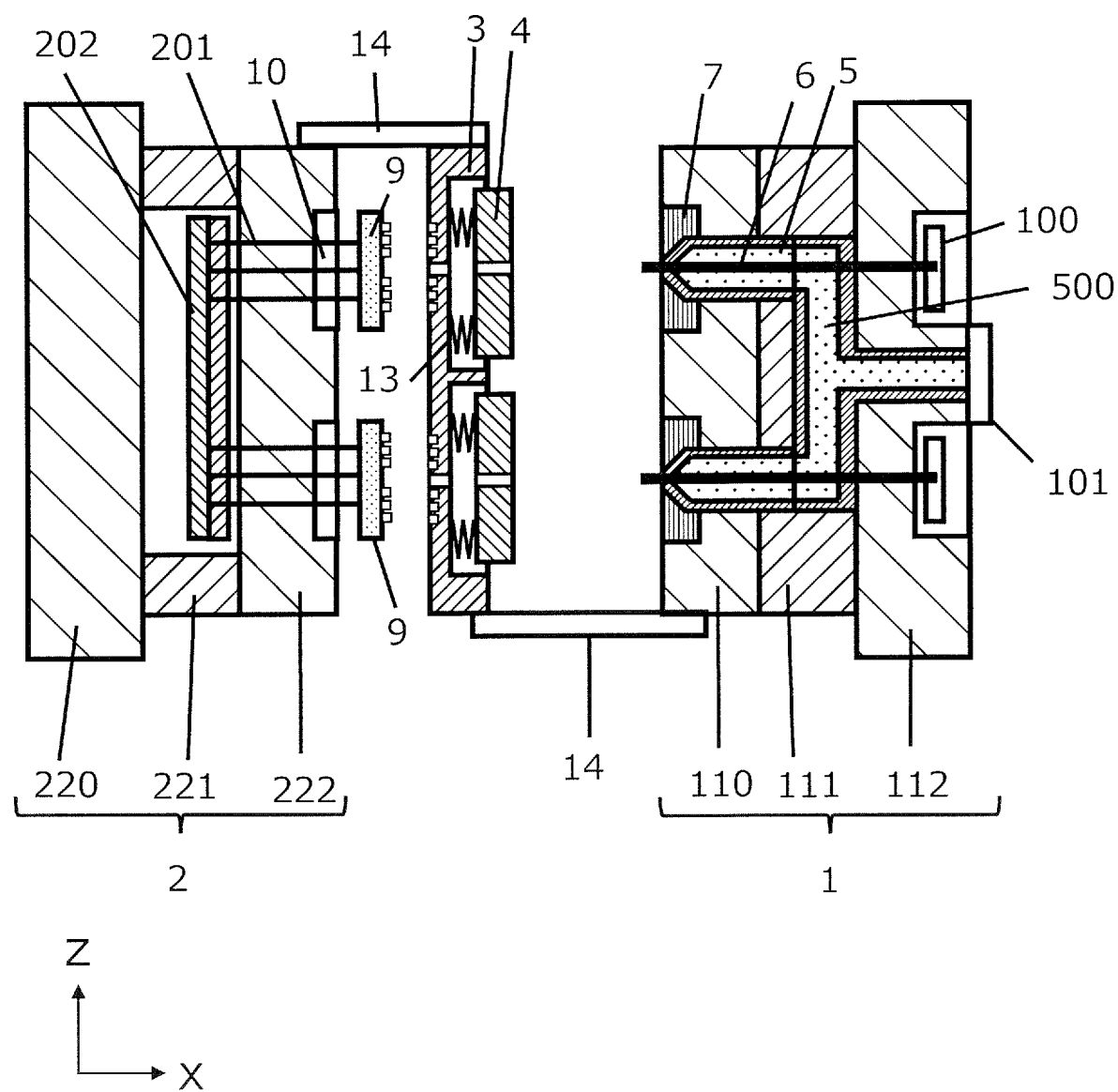
FIG. 10 is a section view of the resin shaping mold illustrating a state of a sixth step of the exemplary embodiment.

Next, a sixth step is a step of releasing the resin molded product 9 from the resin shaping mold. The resin molded product 9 that has solidified is released from the movable-side die set 222 by the ejector pin 201. FIG. 10 is a section view of the resin shaping mold illustrating a state in which the resin molded product 9 is released.

By repeating the steps described above, resin molded products can be successively produced by using the present mold.

According to the present exemplary embodiment, in the first step, since the cold runner 8 is closed by bringing the distal end of the valve pin 6 into contact with the inner mold surface of the cold runner 8, the temperature of the runner lock portion of the valve pin 6 in the closed state can be made lower than the temperature of the hot runner bush. Therefore, the resin in the cold runner 8 can be sufficiently solidified, and the runner-solidified matter 48 can be securely held by the runner lock portion, even in the case where the repeating speed of the steps is set to be relatively high.

In addition, since the cold runner 8 that is tapered toward the cavity 10 is employed, the volume of the runner-solidified matter 48 can be reduced. Then, in the second step, the runner-solidified matter 48 can be securely cut off from the resin molded product 9 at a position of the gate 11, which is the narrowest part. Further, in the third step, the runner-solidified matter 48 can be still held by the tapered surface of the cold runner 8 in the second intermediate mold 4 and the runner lock portion.

Since the runner lock portion is provided with the undercut shape portion that binds the runner-solidified matter 48 in the axial direction of the valve pin 6, the runner-solidified matter 48 can be released from the second intermediate mold 4 in the fourth step, and can be released from the valve pin 6 in the fifth step.

As described above, according to the present exemplary embodiment, the volume of the runner-solidified matter 48 can be reduced, and the runner-solidified matter 48 can be securely held by the runner lock portion and easily taken out of the mold without breaking.

Second Exemplary Embodiment

A basic configuration of a resin shaping mold according to a second exemplary embodiment is similar to that of the first exemplary embodiment described with reference to FIG. 1 except that the form of a valve pin is different from that of the first exemplary embodiment. In addition, the basic operation of the resin shaping mold of the second exemplary embodiment is similar to that of the first exemplary embodiment described with reference to FIGS. 5 to 10. Description of parts common to the first exemplary embodiment will be omitted.

Figure 24:
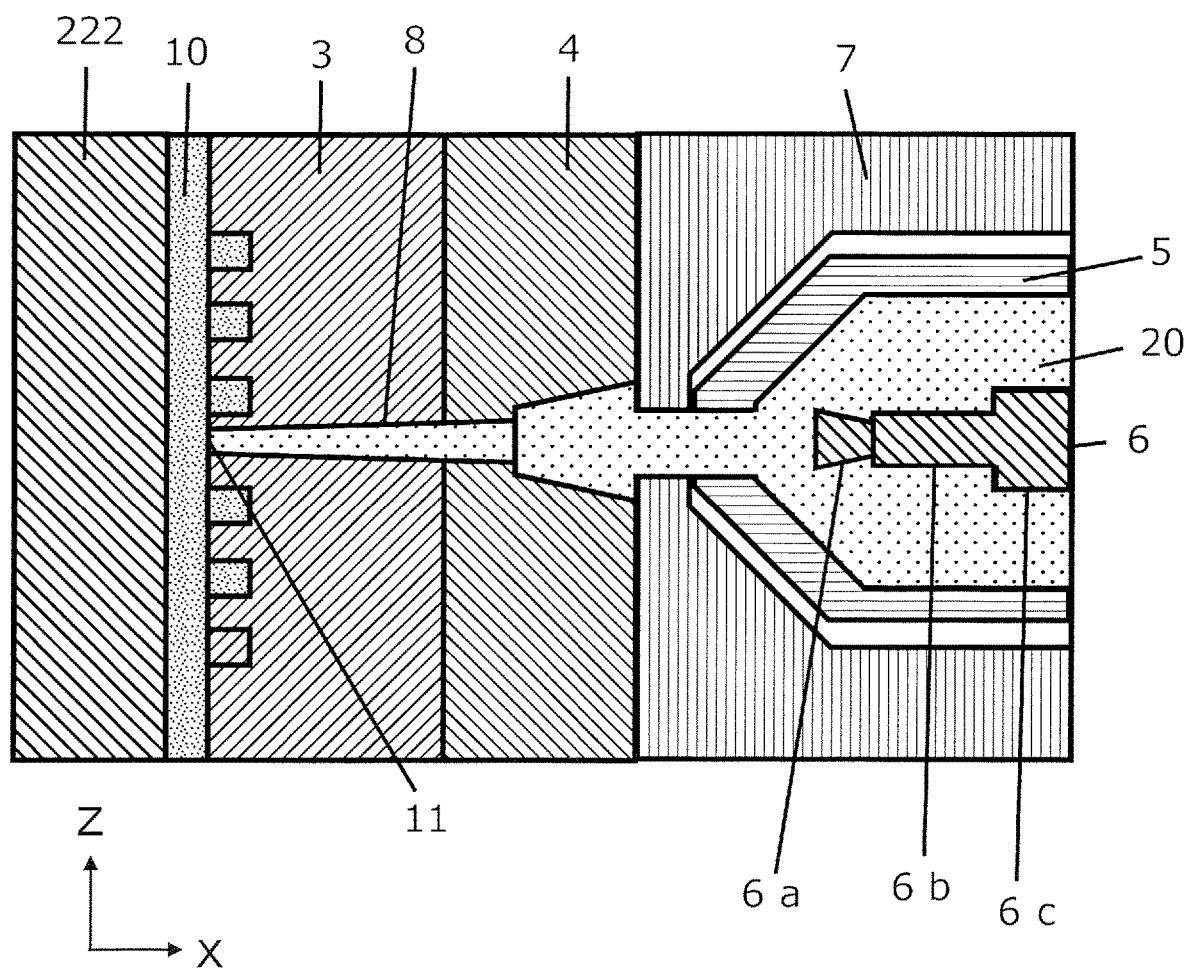
FIG. 24 is a partially enlarged section view of the resin shaping mold illustrating a state during resin injection according to a second exemplary embodiment.
Figure 25:
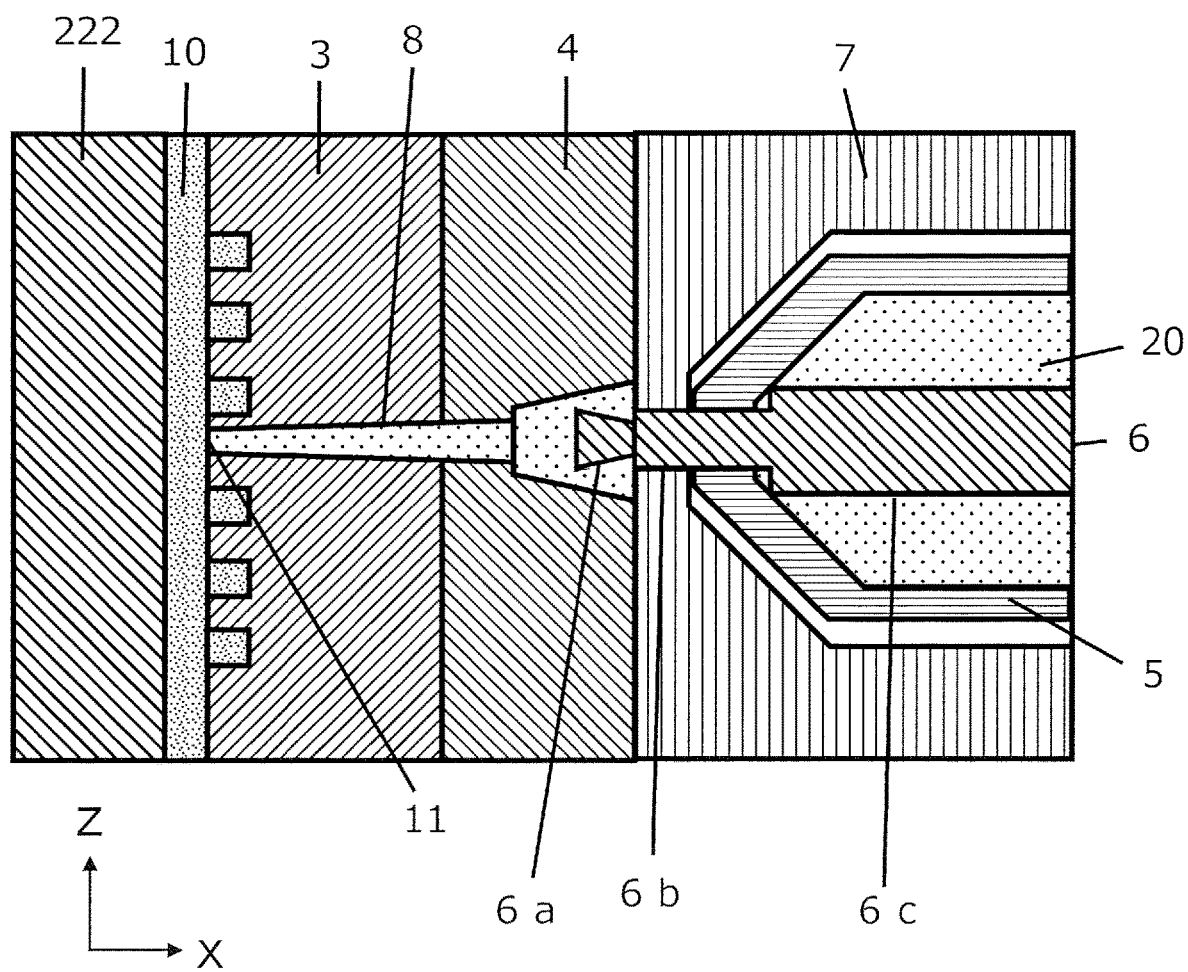
FIG. 25 is a partially enlarged view of the resin shaping mold illustrating a state in which resin injection according to the second exemplary embodiment is stopped.

FIGS. 24 and 25 are partially enlarged section views of the resin shaping mold according to the second exemplary embodiment, in which the same components as in the first exemplary embodiment are denoted by the same reference signs.

The valve pin 6 of the present exemplary embodiment includes a runner lock portion 6a, a bush abutting portion 6b, and a main shaft portion 6c. The runner lock portion 6a provided at the distal end of the valve pin 6 is provided with an undercut shape portion that binds and holds the runner-solidified matter in the axial direction of the valve pin 6. The runner lock portion 6a has a shape that can pass through an outlet opening of the hot runner 5 and an opening of the bush 7. The runner lock portion 6a is positioned in the hot runner 5 as illustrated in FIG. 24 when the valve pin 6 has moved in the +X direction, and the runner lock portion 6a is positioned in the cold runner 8 as illustrated in FIG. 25 when the valve pin 6 has moved in the −X direction.

FIG. 24 illustrates a state in which the valve pin 6 has moved in the +X direction to be positioned in the hot runner 5, and the molten resin 20 is injected into the cavity 10 through the outlet opening of the hot runner 5, the opening of the bush 7, the cold runner 8, and the gate 11. FIG. 25 illustrates a state in which, after the injection of resin into the cavity 10 is completed, the valve pin 6 has moved in the −X direction and the channel of molten resin is closed. In FIG. 25, the bush abutting portion 6b of the valve pin 6 abuts the opening of the bush 7, a corner portion of the main shaft portion 6c abuts the tapered surface of the hot runner 5, and thus the channel for molten resin is closed. That is, the valve pin 6 is capable of closing the channel of molten resin by advancing to a predetermined position on the cold runner 8 side, and, conversely, is capable of opening the channel for molten resin by moving back to the +X side, that is, back into the hot runner 5.

In the state of FIG. 25, when the molten resin in the cavity 10 and the cold runner 8 is cooled, a molded resin product is formed in the cavity 10, and a runner-solidified matter is formed in the cold runner 8. In the present exemplary embodiment, not only a tapered surface but also a step portion is provided in the cold runner in the second intermediate mold 4, and thus the runner-solidified matter can be strongly pulled in the +X direction in the second step described with reference to FIG. 6. Therefore, the runner-solidified matter is securely cut at the position of the gate 11, which is the narrowest part of the cold runner 8.

In addition, in the present exemplary embodiment, as in Example 7 that will be described later, the maximum diameter of the runner-solidified matter in a direction perpendicular to the axial direction of the valve pin 6 is larger than the diameter of the bush abutting portion 6b of the valve pin 6. As a result of this, the structural strength of the part of the runner solidified matter that engages with the runner lock portion 6a can be increased, and thus the runner-solidified matter can be strongly pulled in the +X direction in the fourth step described with reference to FIG. 8. Therefore, the runner-solidified matter can be securely released from the second intermediate mold 4.

As described above, also according to the present exemplary embodiment, the volume of the runner-solidified matter can be reduced, and the runner-solidified matter can be securely held by the runner lock portion and easily taken out of the mold without breakage.

Examples

Figure 3:
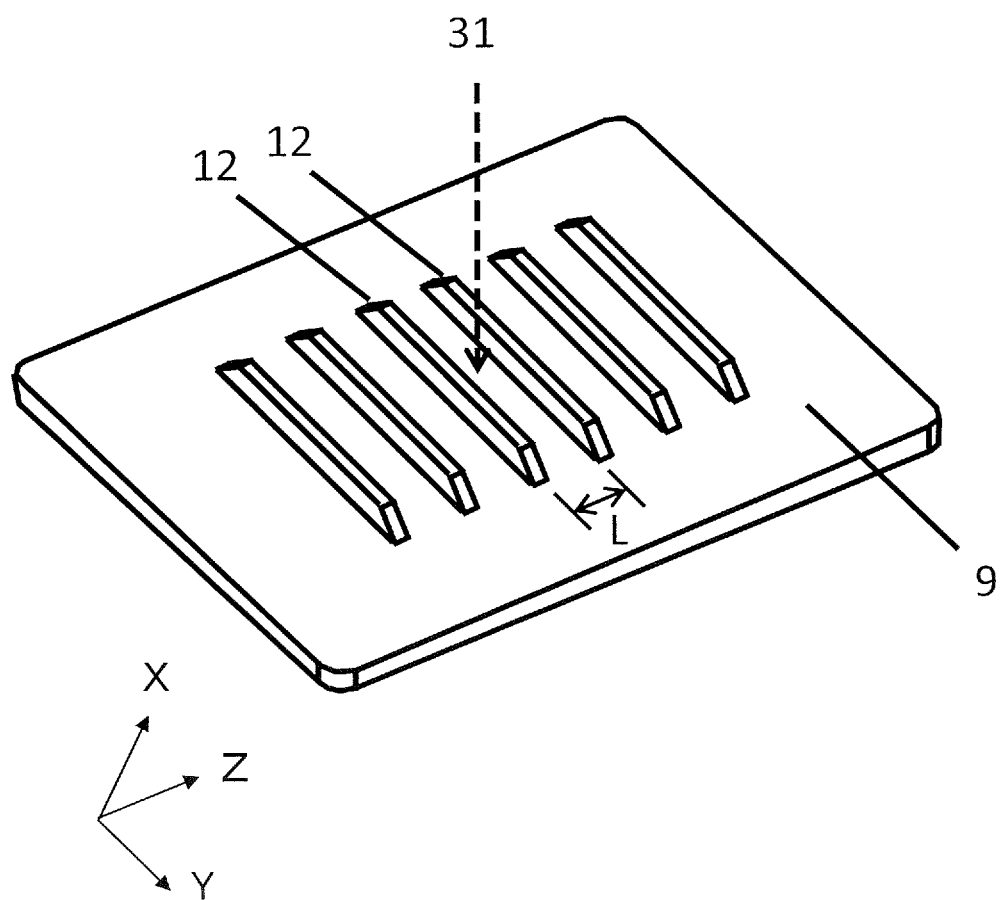
FIG. 3 is an external view of a resin molded product produced in examples and comparative examples.

Examples and comparative examples of the present invention will be described below. In the examples and comparative examples, the resin molded product 9 having an outer shape illustrated in FIG. 3 was produced, and runner-solidified matter generated in the course of product was compared.

The resin molded product 9 has a shape in which six ribs 12 are arranged in parallel on a top surface of a plate-like base portion. Specifically, the plate-like base portion has a shape in which the outer dimensions are 100 mm×80 mm, the thickness is 2 mm, and an inter-rib distance L is 10 mm, and has a weight of 22 g. In a mold for molding the resin molded product 9, a gate is provided at a position corresponding to a position 31 illustrated in FIG. 3. That is, resin is injected into the cavity through the cold runner at a position corresponding to the middle point between two ribs.

In the examples and comparative examples, the resin molded product 9 was produced under molding conditions shown in Table 1.

TABLE 1

| | |
|---|---|
| Resin temperature | 260° C. |
| Mold temperature | 60° C. |
| Hot runner temperature | 260° C. |
| Injection time | 2 second |
| Holding pressure | 60 MPa |
| Cooling time | 20 second |

Example 1

In Example 1, molding was performed by using the resin shaping mold of FIG. 1. Polybutylene terephthalate: PBT was used as the resin. The valve pin 6 and the cold runner 8 whose sectional shape is shown in FIG. 2 were used. The maximum diameter D1 of the cold runner was 4 mm, the diameter D2 on the gate side was 1.2 mm, and the diameter of the valve pin was 4 mm. The diameter of the cold runner monotonically decreased from D1, which was the maximum value, to D2 in a broad sense. That is, the diameter of the cold runner was equal to or smaller than the diameter of the valve pin.

In Example 1, the first to sixth steps of the exemplary embodiment described above were performed to produce the resin molded product. When resin is injected in the first step as illustrated in FIG. 4, the runner-solidified matter 48 is generated in the cold runner 8.

Figure 11A:
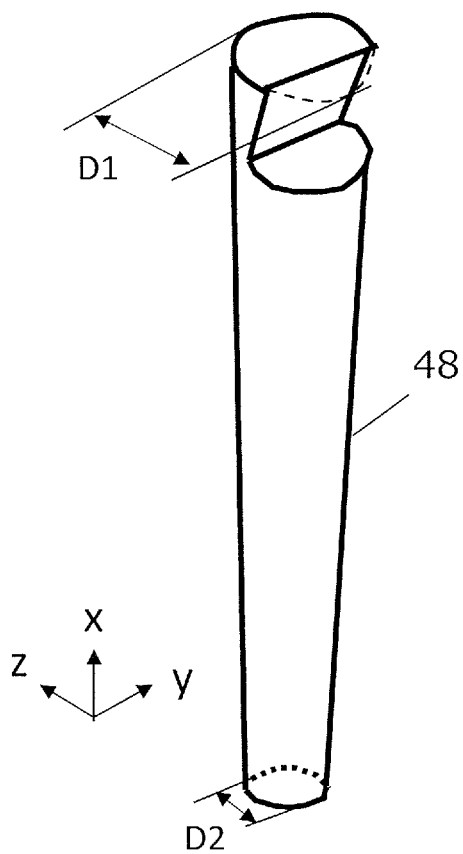
FIG. 11A is an external view of runner-solidified matter of Example 1.
Figure 11B:
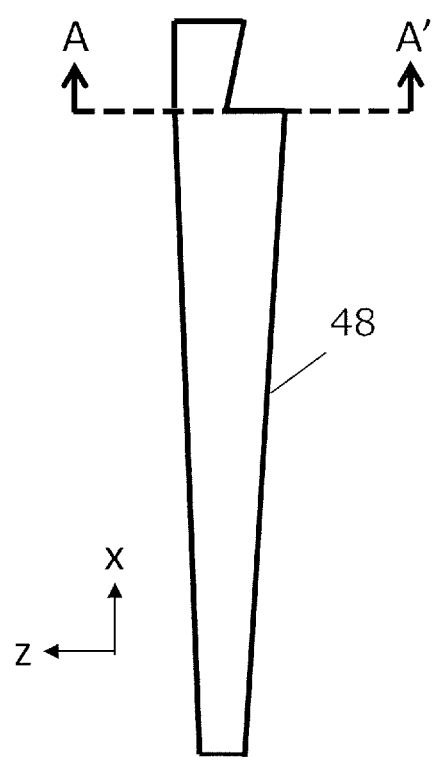
FIG. 11B is an X-Z plan view of the runner-solidified matter of Example 1.
Figure 11C:
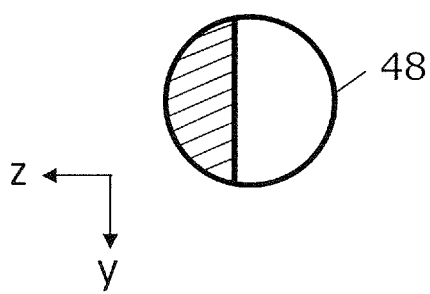
FIG. 11C is a partial section view of the runner-solidified matter of Example 1.

FIGS. 11A to 11C illustrate the shape of the runner-solidified matter 48 of Example 1. FIG. 11A is an external perspective view of the runner-solidified matter 48 illustrating an overall shape thereof. FIG. 11B is an X-Z plan view of the runner-solidified matter 48. FIG. 11C is a section view of the runner-solidified matter 48 taken along an A-A' line in FIG. 11B. As illustrated in FIG. 11A, the runner-solidified matter 48 has a tapered shape reflecting the maximum diameter D1 and the diameter D2 of the cold runner. In FIG. 11B, the X direction corresponds to the axial direction of the valve pin, and an end portion of the runner-solidified matter 48 has an undercut shape as viewed in the X direction, and can be held by engaging with the runner lock portion of the valve pin 6. In FIG. 11C, the −Z direction and the Y direction are directions not bound by the undercut shape in which the runner-solidified matter 48 can be easily separated from the valve pin 6. If the direction in which the runner-solidified matter 48 is separated from the runner lock portion is caused to coincide with the vertical direction, the runner-solidified matter 48 falls freely when taken out. In addition, in the case where the direction in which the runner-solidified matter 48 is separated from the valve pin 6 is set to an arbitrary direction different from the vertical direction, the runner-solidified matter can be easily taken out by using an auto hand or the like. The weight of the runner-solidified matter of Example 1 was 0.23 g.

Example 2

In Example 2, the resin molded product 9 was produced in the same method as in Example 1 except for the shape of the runner lock portion at the distal end portion of the valve pin. That is, similarly to Example 1, molding was performed by using the resin shaping mold of FIG. 1, and PBT was used as the resin. The maximum diameter D1 of the cold runner was 4 mm, the diameter D2 on the gate side was 1.2 mm, and the diameter of the valve pin was 4 mm. The diameter of the cold runner monotonically decreased from D1, which was the maximum value, to D2 in a broad sense. That is, the diameter of the cold runner was equal to or smaller than the diameter of the valve pin.

Also in Example 2, the first to sixth steps of the exemplary embodiment described above were performed to produce the resin molded product. When resin is injected in the first step as illustrated in FIG. 4, the runner-solidified matter 48 is generated in the cold runner 8.

Figure 12A:
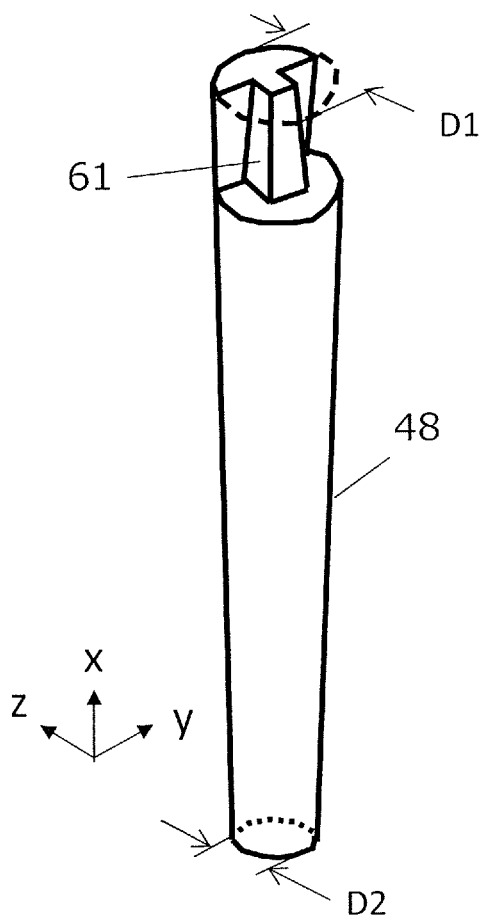
FIG. 12A is an external view of runner-solidified matter of Example 2.
Figure 12B:
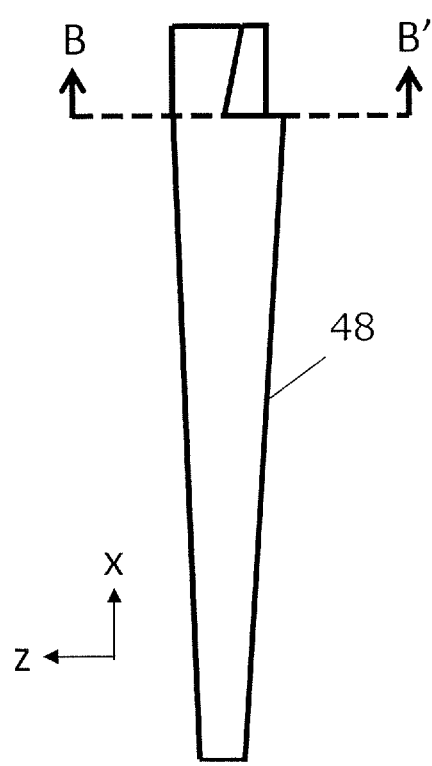
FIG. 12B is an X-Z plan view of the runner-solidified matter of Example 2.
Figure 12C:
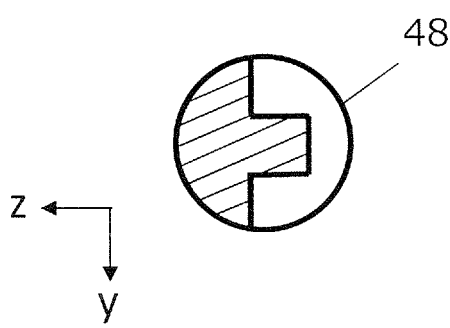
FIG. 12C is a partial section view of the runner-solidified matter of Example 2.

FIGS. 12A to 12C illustrate the shape of the runner-solidified matter 48 of Example 2. FIG. 12A is an external perspective view of the runner-solidified matter 48 illustrating an overall shape thereof. FIG. 12B is an X-Z plan view of the runner-solidified matter 48. FIG. 12C is a section view of the runner-solidified matter 48 taken along a B-B' line in FIG. 12B. As illustrated in FIG. 12A, the runner-solidified matter 48 has a tapered shape reflecting the maximum diameter D1 and the diameter D2 of the cold runner. In FIG. 12B, the X direction corresponds to the axial direction of the valve pin, and an end portion of the runner-solidified matter 48 has an inclined surface that is undercut as viewed in the X direction, and can be held by engaging with the runner lock portion of the valve pin 6.

In Example 2, in contrast with Example 1, the runner-solidified matter 48 is held not only in the X direction but also in the Y direction by the runner lock portion of the valve pin 6. Therefore, in Example 2, the −Z direction of FIG. 12C is a direction not bound by the runner lock portion and in which the runner-solidified matter 48 can be easily separated from the valve pin 6. If the direction in which the runner-solidified matter 48 is separated from the runner lock portion is caused to coincide with the vertical direction, the runner-solidified matter 48 falls freely when taken out. In addition, in the case where the direction in which the runner-solidified matter 48 is separated from the valve pin 6 is set to an arbitrary direction different from the vertical direction, the runner-solidified matter 48 can be easily taken out by using an auto hand or the like. The weight of the runner-solidified matter of Example 2 was 0.23 g.

Example 3

In Example 3, the resin molded product 9 was produced in the same method as in Example 1 except for the shape of the cold runner serving as a resin channel defined in the first intermediate mold 3 and the second intermediate mold 4.

That is, similarly to Example 1, molding was performed by using the resin shaping mold of FIG. 1, and PBT was used as the resin.

Figure 13:
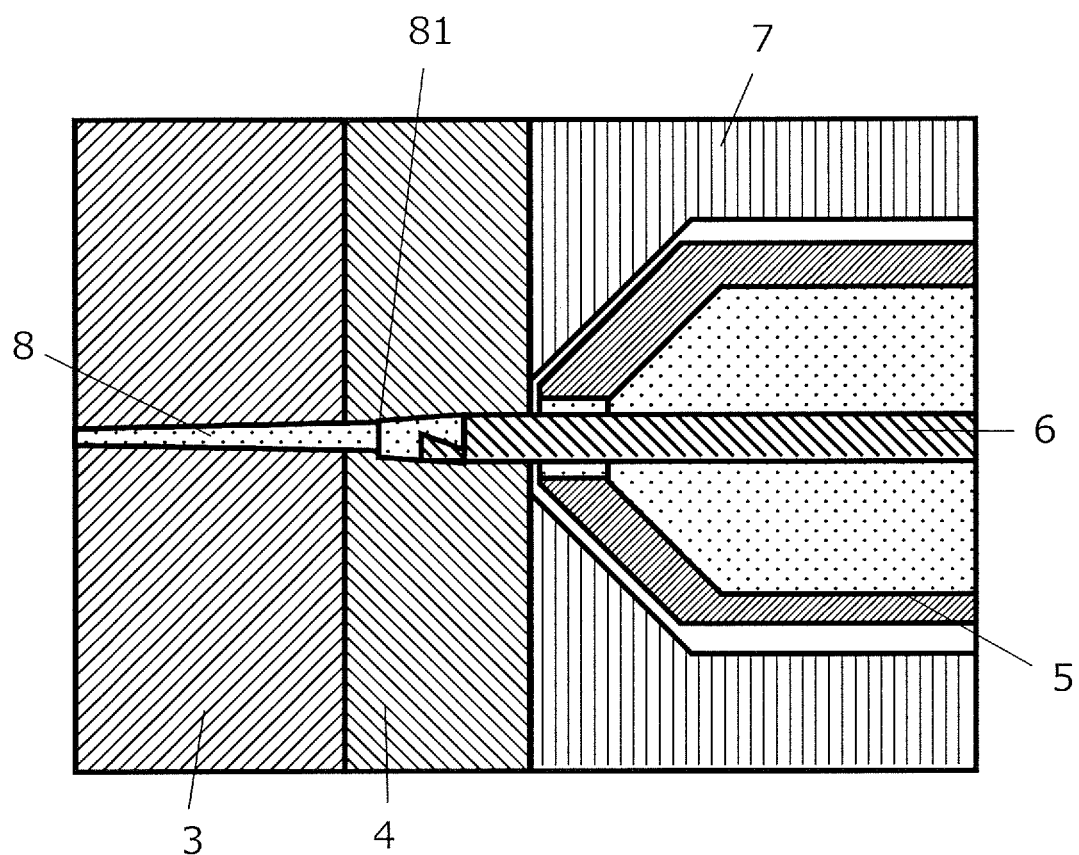
FIG. 13 is a partially enlarged view of a resin shaping mold of Example 3.

FIG. 13 is a section view of the mold illustrating the shape of the cold runner of Example 3. The maximum diameter D1 of the cold runner is 4 mm, the diameter D2 on the gate side is 1.2 mm, and the diameter of the valve pin is 4 mm. In addition, the diameter of the cold runner is equal to or smaller than the diameter of the valve pin.

Also in Example 3, the cold runner has a shape tapered from the runner lock portion toward the gate, that is, a shape in which the sectional area of the channel decreases from the runner lock portion toward the gate. However, in Example 3, a step portion 81 is provided in the cold runner portion in the second intermediate mold 4.

Also in Example 3, the first to sixth steps of the exemplary embodiment described above were performed to produce the resin molded product. When resin is injected in the first step as illustrated in FIG. 4, the runner-solidified matter 48 is generated in the cold runner 8.

In Example 3, as a result of providing the step portion 81 in the cold runner portion in the second intermediate mold 4, the runner-solidified matter 48 is strongly pulled in the +X direction by the second intermediate mold 4 when separating the first intermediate mold 3 and the second intermediate mold 4 from each other in the second step.

Therefore, the runner-solidified matter 48 is securely cut at the position of the gate 11, which is the narrowest part, and is more easily released from the first intermediate mold 3 than in Example 1. The weight of the runner-solidified matter in Example 3 was 0.25 g.

Example 4

In Example 4, the resin molded product 9 was produced in the same method as in Example 1 except for the shape of the runner lock portion at the distal end portion of the valve pin and the shape of the cold runner serving as a resin channel. That is, similarly to Example 1, molding was performed by using the resin shaping mold of FIG. 1, and PBT was used as the resin.

The maximum diameter D1 of the cold runner is 4 mm, the diameter D2 on the gate side is 1.2 mm, and the diameter of the valve pin is 4 mm. The diameter of the cold runner monotonically decreases from D1, which is the maximum value, to D2 in a broad sense. That is, the diameter of the cold runner is equal to or smaller than the diameter of the valve pin. Also in Example 4, the first to sixth steps of the exemplary embodiment described above were performed to produce the resin molded product. When resin is injected in the first step as illustrated in FIG. 4, the runner-solidified matter 48 is generated in the cold runner 8.

FIGS. 17A to 17C illustrate the shape of the runner-solidified matter 48 of Example 4. FIG. 17A is an external perspective view of the runner-solidified matter 48 illustrating an overall shape thereof. FIG. 17B is an X-Y plan view of the runner-solidified matter 48. FIG. 17C is a section view of the runner-solidified matter 48 taken along a C-C' line. In Example 4, unlike Example 1, the runner-solidified matter 48 is held not only in the X direction but also in the Y direction. Therefore, in Example 4, the −Z direction is a direction not bound by the runner lock portion and the runner-solidified matter 48 falls freely. If the direction in which the runner-solidified matter 48 is not bound is set to an arbitrary direction different from the vertical direction, the runner-solidified matter 48 can be easily taken out by using an auto hand or the like.

In Example 4, as a result of providing the step portion 81 in the cold runner portion in the second intermediate mold 4, the runner-solidified matter 48 is strongly pulled in the +X direction by the second intermediate mold 4 when separating the first intermediate mold 3 and the second intermediate mold 4 from each other in the second step. Therefore, the runner-solidified matter 48 is securely cut at the position of the gate 11, which is the narrowest part, and is more easily released from the first intermediate mold 3 than in Example 1. The weight of the runner-solidified matter in Example 4 was 0.23 g.

Example 5

Figure 18C:
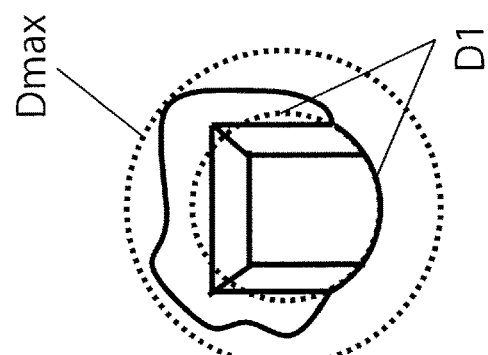
FIG. 18C is a top view of the runner-solidified matter of Example 5.
Figure 18B:
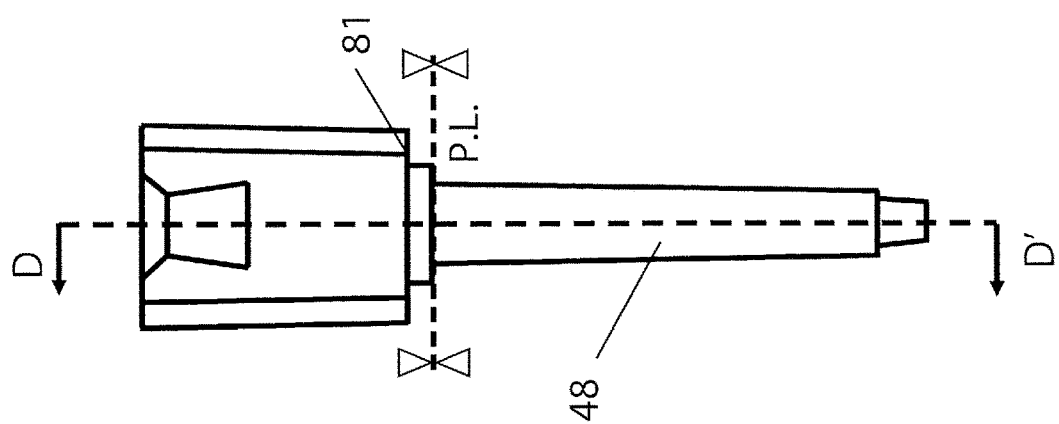
FIG. 18B is an X-Y plan view of the runner-solidified matter of Example 5.
Figure 18A:
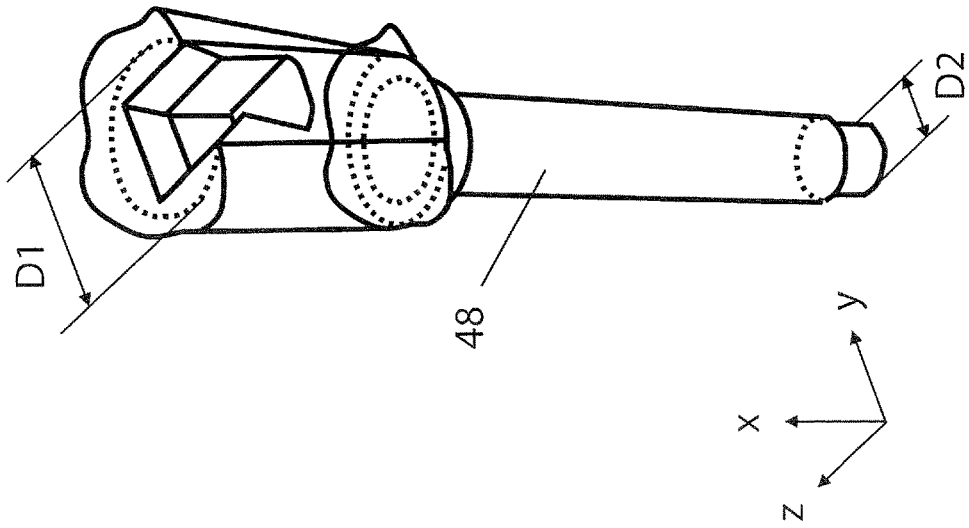
FIG. 18A is an external view of runner-solidified matter of Example 5.

FIGS. 18A to 18C illustrate the shape of the runner-solidified matter 48 of Example 5. FIG. 18A is an external perspective view of the runner-solidified matter 48 illustrating an overall shape thereof. FIG. 18B is an X-Y plan view of the runner-solidified matter 48. FIG. 18C is a top view of the runner-solidified matter 48. In Example 5, the resin molded product 9 was produced in the same method as in Example 4 except for the shape of the runner lock portion at the distal end portion of the valve pin. That is, similarly to Example 4, molding was performed by using the resin shaping mold of FIG. 1, and PBT was used as the resin. The maximum diameter D1 of the cold runner in the direction in which the resin-solidified matter can be separated is 4 mm, the maximum diameter Dmax in a region not in the direction in which the resin-solidified matter can be separated is 6 mm, the diameter D2 on the gate side is 1.2 mm, and the diameter of the valve pin is 4 mm. Elements other than these are the same as Example 4.

The runner-solidified matter 48 can be thicker than in Example 4, and the rigidity thereof can be increased. Although the region not in the direction in which the runner-solidified matter 48 can be separated comes into contact with a bush 7 of the hot runner, the range of contact is sufficiently small, and the cooling of the runner-solidified matter 48 is not affected. The weight of the runner-solidified matter of Example 5 was 0.53 g.

Example 6

FIGS. 19A to 19D illustrate the shape of the runner-solidified matter 48 of Example 6. FIG. 19A is an external perspective view of the runner-solidified matter 48 illustrating an overall shape thereof. FIG. 19B is an X-Y plan view of the runner-solidified matter 48. FIG. 19C is a section view of the runner-solidified matter 48 taken along an E-E' line. FIG. 19D is a diagram illustrating an engaged state of the runner-solidified matter and the valve pin.

In Example 6, the resin molded product 9 was produced in the same method as in Example 4 except for the shape of the runner lock portion at the distal end portion of the valve pin. That is, similarly to Example 4, molding was performed by using the resin shaping mold of FIG. 1, and PBT was used as the resin.

The diameter D1 of the cold runner is 2 mm, the diameter D2 on the gate side is 1.2 mm, and the diameter of the valve pin is 2 mm. Elements other than these are the same as in Example 4.

A groove portion of the runner-solidified matter 48 corresponds to the runner lock portion at the distal end of the valve pin, and the runner-solidified matter has a truncated conical shape in which the inner diameter of the groove portion increases from the valve pin side toward the gate side connecting to the resin molded product 9. As a result of this, the runner-solidified matter 48 is bound in a direction crossing the axial direction of the valve pin, the groove portion of the runner-solidified matter is undercut in the X direction, and thus the runner-solidified matter 48 is strongly pulled in the +X direction by the valve pin when releasing from the mold. The weight of the runner-solidified matter in Example 6 was 0.15 g.

Example 7

FIGS. 20A to 20D illustrate the shape of the runner-solidified matter 48 of Example 7. FIG. 20A is an external perspective view of the runner-solidified matter 48 illustrating an overall shape thereof. FIG. 20B is an X-Y plan view of the runner-solidified matter 48. FIG. 20C is a section view of the runner-solidified matter 48 taken along an F-F' line. FIG. 20D is a diagram illustrating an engaged state of the runner-solidified matter and the valve pin.

Example 7 is the same as Example 6 except for the size of the runner lock portion at the distal end portion of the valve pin. The diameter D1 of the cold runner is 3.3 mm, the diameter D2 on the gate side is 1.2 mm, and the diameter of the valve pin is 2 mm. Elements other than these are the same as Example 6.

The runner-solidified matter 48 can be thicker than in Example 6, and the rigidity thereof can be increased. Although the runner-solidified matter 48 partially comes into contact with the bush 7 because the diameter D1 of the runner-solidified matter 48 is larger than the diameter of the valve pin, the range of contact is sufficiently small, and the cooling of the runner-solidified matter 48 is not affected. The weight of the runner-solidified matter of Example 7 was 0.17 g.

Example 8

Figure 21C:
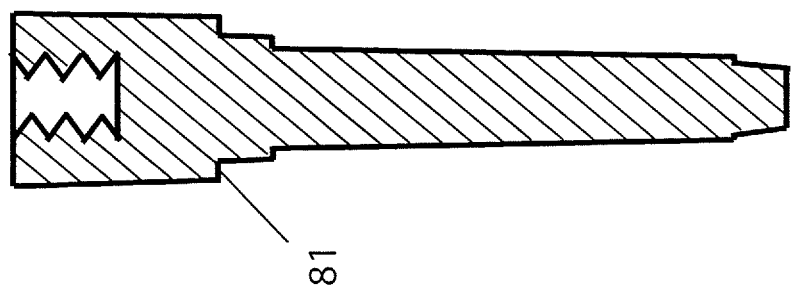
FIG. 21C is a section view of the runner-solidified matter of Example 8.
Figure 21B:
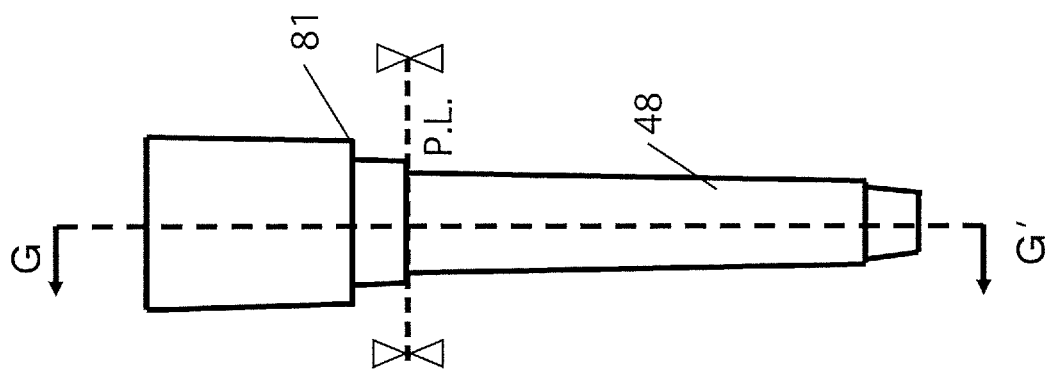
FIG. 21B is an X-Y plan view of the runner-solidified matter of Example 8.
Figure 21A:
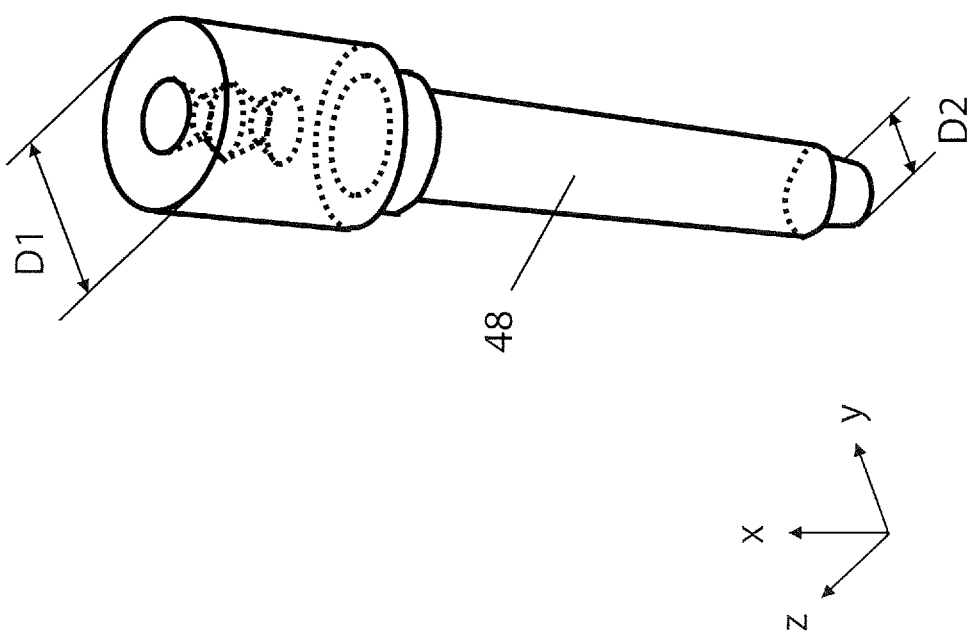
FIG. 21A is an external view of runner-solidified matter of Example 8.

FIGS. 21A to 21C illustrate the shape of the runner-solidified matter 48 of Example 8. FIG. 21A is an external perspective view of the runner-solidified matter 48 illustrating an overall shape thereof. FIG. 21B is an X-Y plan view of the runner-solidified matter 48. FIG. 21C is a section view of the runner-solidified matter 48 taken along a G-G' line.

Example 8 is the same as Example 6 except for the shape of the runner lock portion at the distal end portion of the valve pin. The diameter D1 of the cold runner is 3.3 mm, the diameter D2 on the gate side is 1.2 mm, and the diameter of the valve pin is 2 mm. Elements other than these are the same as Example 6.

A groove portion of the runner-solidified matter 48 corresponds to the runner lock portion at the distal end of the valve pin, and the runner-solidified matter has a shape in which the inner diameter of the groove portion periodically increases and decreases in a direction from the valve pin side toward the gate side connecting to the resin molded product 9. The pitch of periodical grooves is 0.3 mm, and the cut depth of each groove is 0.3 mm. The sectional area of a section of the groove portion taken along a plane perpendicular to the axial direction of the valve pin at a position closer to the cavity than a first position is larger than the sectional area of a section of the groove portion taken along a plane perpendicular to the axial direction of the valve pin at the first position. As a result of this, the runner-solidified matter 48 is bound in the direction crossing the axial direction of the valve pin, the groove portion of the runner-solidified matter is undercut in the X direction, and thus the runner-solidified matter 48 is more strongly pulled in the +X direction by the valve pin when releasing from the mold than in Example 6. Although the runner-solidified matter 48 partially comes into contact with the bush 7 because the diameter D1 of the runner-solidified matter 48 is larger than the diameter of the valve pin, the range of contact is sufficiently small, and thus the cooling of the runner-solidified matter 48 is not affected. The weight of the runner-solidified matter in Example 8 was 0.17 g.

Example 9

FIGS. 22A to 22C illustrate the shape of the runner-solidified matter 48 of Example 9. FIG. 22A is an external perspective view of the runner-solidified matter 48 illustrating an overall shape thereof. FIG. 22B is an X-Y plan view of the runner-solidified matter 48. FIG. 22C is a section view of the runner-solidified matter 48 taken along an H-H' line.

Example 9 is the same as Example 6 except for the shape of the runner lock portion at the distal end portion of the valve pin. The diameter D1 of the cold runner is 3.3 mm, the diameter D2 on the gate side is 1.2 mm, and the diameter of the valve pin is 2 mm. Elements other than these are the same as Example 6.

A groove portion of the runner-solidified matter 48 corresponds to the runner lock portion at the distal end of the valve pin, and the runner-solidified matter has a shape in which the groove portion extends along a spiral from the valve pin side toward the gate side connecting to the resin molded product 9. That is, the runner lock portion at the distal end of the valve pin includes a groove portion having a shape similar to a thread of a bolt extending along a spiral, and the runner-solidified matter has a shape similar to a thread of a nut. The pitch of the spiral shape is 0.3 mm, and the cut depth of the spiral shape is 0.3 mm. As a result of this, the runner-solidified matter 48 is bound in the direction crossing the axial direction of the valve pin, the groove portion of the runner-solidified matter includes a plurality of undercut portions in the X direction, and thus the runner-solidified matter 48 is more strongly pulled in the +X direction by the valve pin when releasing from the mold than in Example 6.

In addition, when releasing the runner-solidified matter 48 from the valve pin, the runner-solidified matter 48 can be easily released by rotating the runner-solidified matter 48 along the spiral shape of the groove portion like when releasing a bolt and a nut engaged with each other. Although the runner-solidified matter 48 partially comes into contact with the bush 7 because the diameter D1 of the runner-solidified matter 48 is larger than the diameter of the valve pin, the range of contact is sufficiently small, and thus the cooling of the runner-solidified matter 48 is not affected. The weight of the runner-solidified matter in Example 9 was 0.17 g.

Example 10

Example 10 is the same as Example 7 except for the diameter of the runner-solidified matter. The diameter D1 of the cold runner is 6 mm, the diameter D2 on the gate side is 1.2 mm, and the diameter of the valve pin is 2 mm. Elements other than these are the same as Example 6. The weight of the runner-solidified matter in Example 10 was 0.45 g.

Example 11

FIGS. 23A to 23D illustrate the shape of the runner-solidified matter 48 of Example 11. FIG. 23A is an external perspective view of the runner-solidified matter 48 illustrating an overall shape thereof. FIG. 23B is an X-Y plan view of the runner-solidified matter 48. FIG. 23C is a section view of the runner-solidified matter 48 taken along an I-I' line. FIG. 23D is a diagram illustrating an engaged state of the runner-solidified matter and the valve pin.

Example 11 is the same as Example 6 except for the diameter of the runner-solidified matter and the diameter of the valve pin.

The diameter D1 of the cold runner is 3.3 mm, the diameter D2 on the gate side is 1.2 mm, and the diameter of the valve pin is 4 mm. Elements other than these are the same as Example 6. The weight of the runner-solidified matter in Example 11 was 0.17 g.

Comparative Example 1

A mold similar to a resin shaping mold described with reference to FIG. 4 of Japanese Patent Laid-Open No. 3-261528 was used in Comparative Example 1. That is, in Comparative Example 1, the resin molded product 9 was produced by using a resin shaping mold illustrated in FIG. 14. PBT was used as the resin similarly to the examples.

Figure 14:
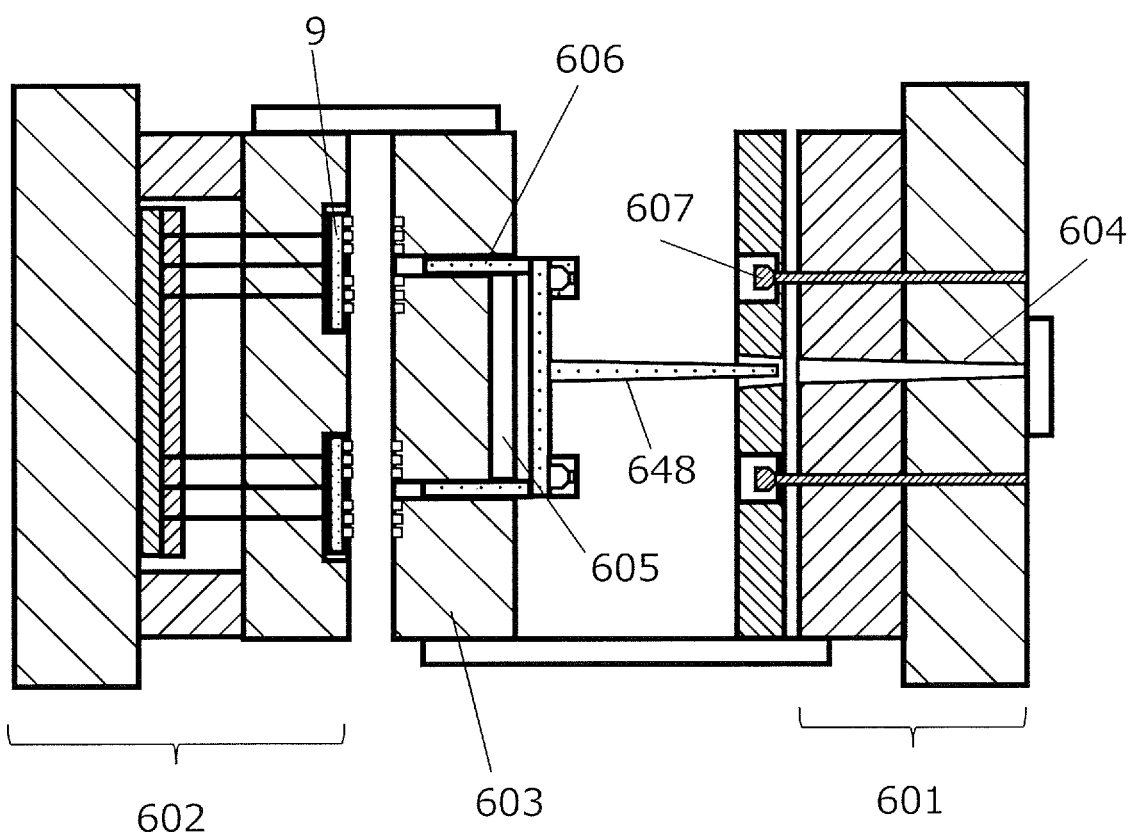
FIG. 14 is a brief section view of a resin shaping mold of Comparative Example 1 illustrating a configuration thereof.

FIG. 14 illustrates a fixed mold 601, a movable mold 602, and an intermediate mold 603. The fixed mold 601 includes a trunk cold runner 604, and molten resin is injected thereinto from a hot runner that is not illustrated. The intermediate mold 603 is provided with a cold runner groove 605 that distributes the molten resin injected into the trunk cold runner 604 to respective cavities and branch cold runners 606 directly connecting to the respective cavities. The trunk cold runner 604, the cold runner groove 605, and the branch cold runners 606 communicate with one another, and constitute a cold runner portion as a whole.

The fixed mold 601 is provided with runner lock pins 607 projecting to the cold runner portion, and is capable of holding a runner-solidified matter 648 solidified in the cold runner portion. To be noted, the runner lock pins 607 of Comparative Example 1 do not have a function of opening and closing the channel of the cold runner unlike the valve pin 6 of the examples. In addition, the runner lock pins 607 are different from the valve pin 6 of the examples also in that the runner lock pins 607 are not capable of moving forward and backward from the bush of the hot runner into the cold runners.

In Comparative Example 1, since the channel capacity of the cold runner portion was large, the volume of the runner-solidified matter 648 was large, and the weight of the runner-solidified matter 648 was 4.0 g.

Comparative Example 2

In Comparative Example 2, a mold similar to a resin shaping mold described with reference to FIG. 1 of Japanese Patent Laid-Open No. 3-261528 was used. That is, in Comparative Example 2, the resin molded product 9 was produced by using a resin shaping mold illustrated in FIG. 15. PBT was used as the resin similarly to the examples.

Figure 15:
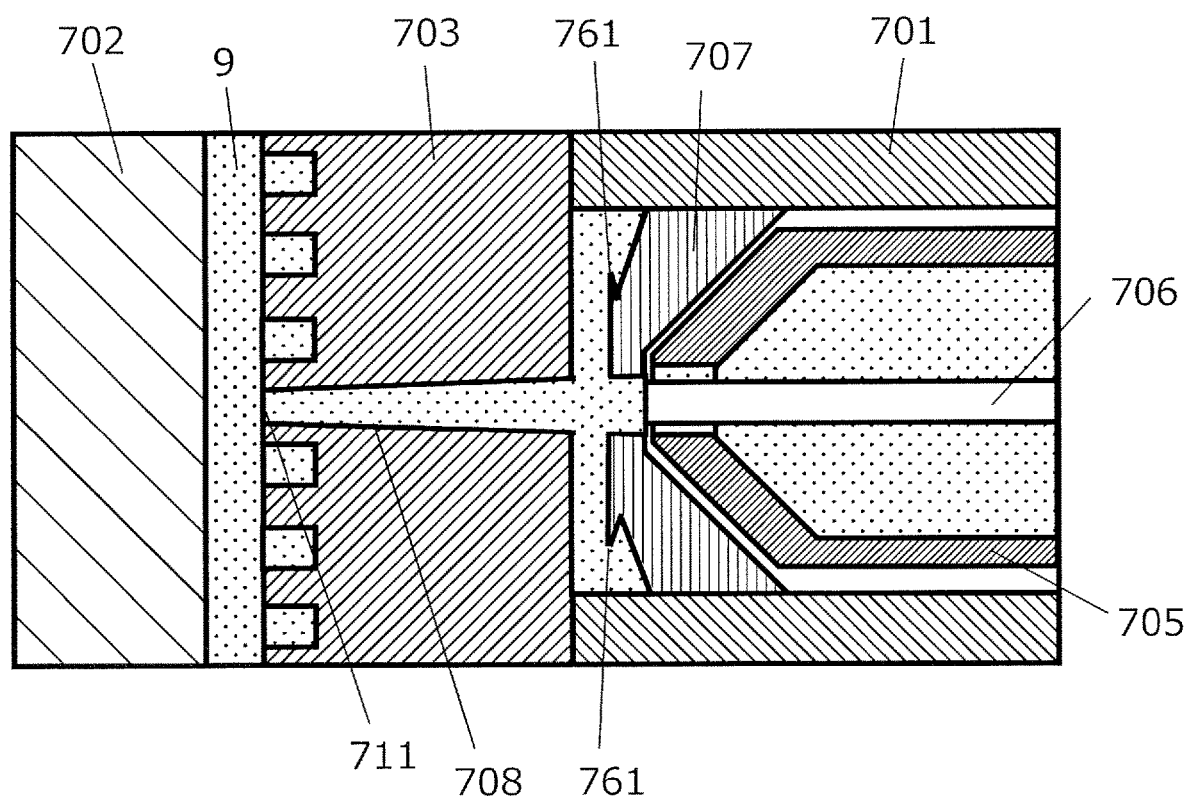
FIG. 15 is a brief section view of a resin shaping mold of Comparative Example 2 illustrating a configuration thereof.

FIG. 15 illustrates a fixed mold 701, a movable mold 702, and an intermediate mold 703. In the fixed mold 701, a hot runner 705 and a bush 707 of the hot runner are disposed with an interval from the intermediate mold 703. The space between the bush 707 of the hot runner and the intermediate mold 703 also functions as a channel for the resin, that is, part of the cold runner. The hot runner 705 is provided with a hot runner pin 706 for opening and closing the outlet of the hot runner 705. The intermediate mold 703 is provided with a cold runner 708.

The bush 707 of the hot runner of Comparative Example 2 is provided with a projection 761 for holding the runner-solidified matter 748 solidified in the cold runner portion, and the projection 761 functions as the runner lock portion. The diameter of the bush 707 of the hot runner is 40 mm, and the diameter of the runner-solidified matter 748 engaged with the projection 761 and thus held is also 40 mm. In Comparative Example 2, since the capacity of the cold runner portion was large, the volume of the runner-solidified matter 748 was also large, and thus the weight of the runner-solidified matter 748 was 2.2 g. In addition, since the temperature of the bush 707 of the hot runner was relatively high, the resin did not sufficiently solidify in the vicinity of the projection 761 in the same cooling time as the examples, and sometimes there was a problem in taking out the runner-solidified matter 748.

Results

Results of Examples 1 to 11 and Comparative Examples 1 and 2 are shown in Table 2.

TABLE 2

| | Weight of runner-solidified matter | Reduction ratio of runner-solidified matter | Releasability of runner-solidified matter |
|---|---|---|---|
| Example 1 | 0.23 g | 94% | 1 |
| Example 2 | 0.23 g | 94% | 1 |
| Example 3 | 0.25 g | 93% | 2 |
| Example 4 | 0.23 g | 94% | 2 |
| Example 5 | 0.53 g | 86% | 2 |
| Example 6 | 0.15 g | 96% | 2 |
| Example 7 | 0.17 g | 95% | 2 |
| Example 8 | 0.17 g | 95% | 3 |
| Example 9 | 0.17 g | 95% | 3 |
| Example 10 | 0.45 g | 88% | 2 |
| Example 11 | 0.17 g | 95% | 2 |
| Comparative Example 1 | 4.0 g | — | — |
| Comparative Example 2 | 2.2 g | 45% | — |

As shown in Table 2, according to the examples of the present invention, the amount of generation of runner-solidified matter can be reduced greatly with respect to the comparative examples. Calculating the reduction ratio on the basis of Comparative Example 1, it can be seen that reduction as much as 86% to 96% is possible.

In addition, the numbers shown in the field of releasability of the runner-solidified matter are indices indicating how easily the runner-solidified matter is released from the mold. A larger number represents higher certainty that the release from the mold is performed appropriately. In other words, a larger number indicates that the holding power of the runner lock portion for holding the runner-solidified matter is larger and the runner-solidified matter is more likely to be cut at the gate portion. To be noted, for Comparative Examples 1 and 2, since problems often occurred while taking out the runner-solidified matter, the numbers are not shown.

Embodiments of the present invention is not limited to the embodiment and the examples described above and can be modified and combined appropriately.

Although the molding was performed by using PBT resin under the molding conditions of Table 1 in the examples, the amount of generation of the runner-solidified matter can be reduced greatly also in the case where a resin material other than this is used if the present invention is implemented. For example, the present invention can be implemented with resins such as polystyrene: PS resin, acrylonitrile-butadienestyrene copolymer: ABS resin, polycarbonate: PC+ABS resin, and polyacetal: POM resin. The molding conditions may be appropriately adjusted in accordance with the material, and, for example, the mold temperature can be preferably adjusted within a range from 30° C. to 80° C.

Figure 16:
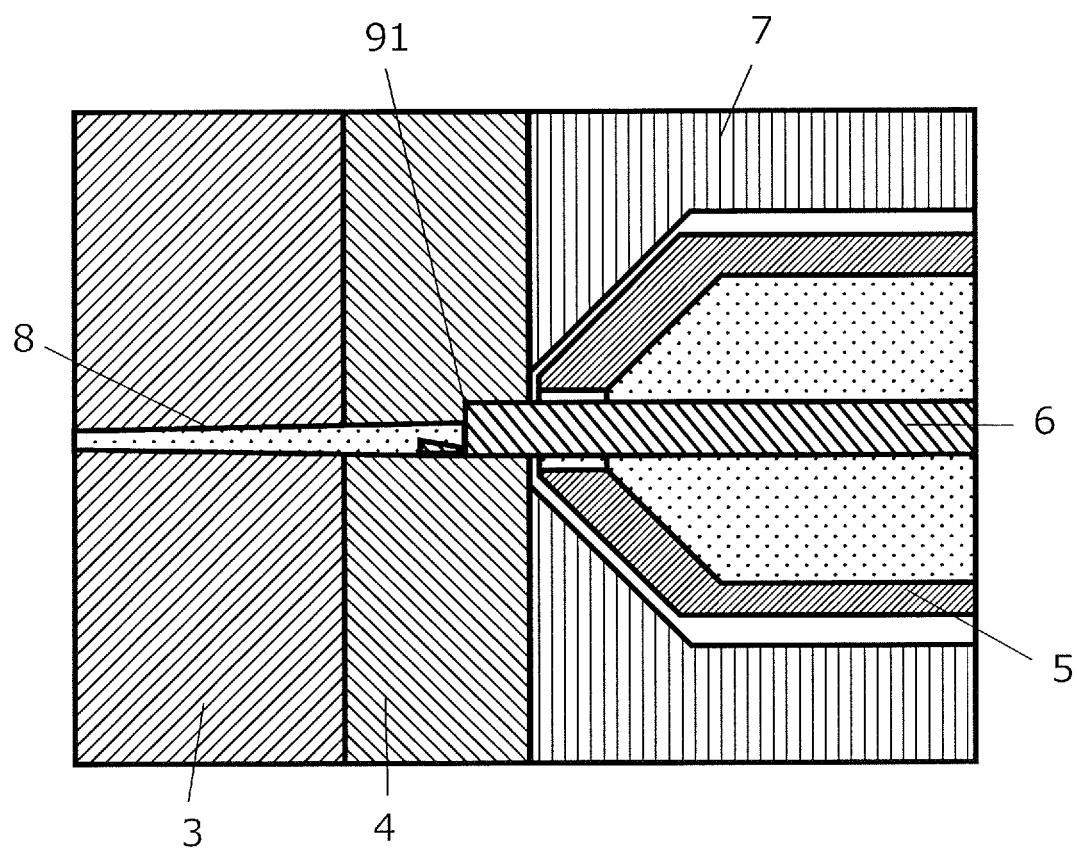
FIG. 16 is a partially enlarged view of a resin shaping mold of another exemplary embodiment illustrating a configuration thereof.

The mechanism of opening and closing a cold runner by a valve pin including a runner lock structure at the distal end thereof is not limited to the examples of FIGS. 2 and 13. For example, as illustrated in FIG. 16, the valve pin 6 may close the cold runner 8 by abutting an abutting step portion 91 of the cold runner 8. In this case, the maximum diameter of the cold runner is smaller than the diameter of the valve pin. In short, the mechanism of closing the cold runner by the valve pin may be any mechanism as long as the cold runner can be closed/opened by bringing a valve pin provided with a runner lock portion capable of holding a runner-solidified matter at the distal end thereof into/out of contact with the inner surface of the mold by moving the valve pin forward/backward toward the cold runner side.

In addition, the sectional shape of the channel of the cold runner is not limited to a circular shape, and may be, for example, an elliptical shape or a polygonal shape.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-205561, filed on Oct. 24, 2017, and Japanese Patent Application No. 2018-172361, filed on Sep. 14, 2018, which are hereby incorporated by reference herein in their entirety.

What is claimed is:

1. A resin shaping mold having a cavity for forming a resin molded product, comprising:
   a fixed-side mold comprising a hot runner;
   a first intermediate mold comprising a first cold runner, the first cold runner configured to connect the hot runner and the cavity and has a lower temperature than the hot runner;
   a second intermediate mold comprising a second cold runner configured to connect the hot runner and the first cold runner and has a lower temperature than the hot runner;
   a movable-side mold, the cavity being formed between the first intermediate mold and the movable-side mold; and
   a separation mechanism for separating the first intermediate mold and the second intermediate mold from each other;
   a valve pin configured to move forward and backward in a direction along an axial direction of the valve pin, between the hot runner and the second cold runner,
   wherein the valve pin moved forward closes a channel of molten resin from the hot runner to the cavity,
   wherein the valve pin moved backward opens the channel of molten resin from the hot runner to the cavity,
   wherein the valve pin comprises a runner lock portion, which holds resin solidified in the second cold runner, and
   wherein the separation mechanism is configured to move the first intermediate mold in the direction along the axial direction of the valve pin to separate the first intermediate mold and the second intermediate mold from each other.

2. The resin shaping mold according to claim 1, wherein the runner lock portion has such a shape as to hold the resin solidified in the second cold runner in the axial direction of the valve pin.

3. The resin shaping mold according to claim 2, wherein a sectional area of a section of the runner lock portion taken along a plane perpendicular to the axial direction of the valve pin at a position closer to the cavity than a first position is larger than a sectional area of a section of the runner lock portion taken along a plane perpendicular to the axial direction of the valve pin at the first position.

4. The resin shaping mold according to claim 2, wherein the runner lock portion comprises a spiral shape extending in the axial direction of the valve pin.

5. The resin shaping mold according to claim 1, wherein the runner lock portion is configured such that the resin solidified in the second cold runner is capable of being separated from the runner lock portion in a direction crossing the axial direction of the valve pin.

6. The resin shaping mold according to claim 5, wherein the runner lock portion is configured such that the resin solidified in the second cold runner is capable of being separated from the runner lock portion in a vertical direction.

7. The resin shaping mold according to claim 6, wherein the resin solidified in the second cold runner is capable of separating from the runner lock portion in only one separable direction that is one of an upward direction and a downward direction in the vertical direction.

8. The resin shaping mold according to claim 7, wherein a diameter of the resin solidified in the second cold runner in the separable direction is smaller than a diameter of the valve pin, and a diameter of the resin solidified in the second cold runner in a direction crossing the separable direction is equal to or larger than the diameter of the valve pin.

9. The resin shaping mold according to claim 2, wherein the runner lock portion is capable of holding the resin solidified in the second cold runner in a direction crossing the axial direction of the valve pin.

10. The resin shaping mold according to claim 9, wherein a maximum diameter of the resin solidified in the second cold runner is larger than a diameter of the valve pin.

11. The resin shaping mold according to claim 9, wherein an inner diameter of a groove portion of the resin solidified in the second cold runner corresponding to the runner lock portion increases from a side of the valve pin toward a gate connecting to the cavity.

12. The resin shaping mold according to claim 9, wherein an inner diameter of a groove portion of the resin solidified in the second cold runner corresponding to the runner lock portion periodically increases and decreases in a direction from a side of the valve pin toward a gate connecting to the cavity.

13. The resin shaping mold according to claim 1, wherein a sectional area of the channel of molten resin within the second cold runner gradually decreases in a direction from a side of the valve pin to a gate connecting to the cavity.

14. The resin shaping mold according to claim 1,
   wherein the first intermediate mold is arranged between the movable-side mold and the second intermediate mold in the direction along the axial direction of the valve pin, and wherein the second intermediate mold is arranged between the first intermediate mold and the fixed-side mold in the direction along the axial direction of the valve pin.

15. The resin shaping mold according to claim 14, wherein, in a case of separating the first intermediate mold and the second intermediate mold from each other, the resin solidified in the second cold runner is held by a tapered surface of the second cold runner provided in the second intermediate mold and the runner lock portion, and is cut off from resin solidified in the cavity.

16. The resin shaping mold according to claim 14, wherein the second cold runner and the resin solidified in the second cold runner each comprise a tapered surface in a range constituted by the second intermediate mold.

17. The resin shaping mold according to claim 14, wherein the second cold runner and the resin solidified in the second cold runner each comprise a step in a range within the second intermediate mold.

18. The resin shaping mold according to claim 14, wherein, in a case of separating the first intermediate mold and the second intermediate mold from each other, the resin solidified in the second cold runner is held by a step of the second cold runner provided in the second intermediate mold and the runner lock portion, and is cut off from resin solidified in the cavity.

19. A method of producing a resin molded product by using the resin shaping mold according to claim 1, the method comprising:
- injecting resin into the cavity through the hot runner and the second and first cold runners;
- closing, by the valve pin, the channel of molten resin;
- holding, by the valve pin, solidified resin in the second cold runner on a cavity side with respect to the valve pin; and
- cutting the solidified resin held by the valve pin from solidified resin in the cavity.

* * * * *